US010629955B2

United States Patent
He et al.

(10) Patent No.: US 10,629,955 B2
(45) Date of Patent: Apr. 21, 2020

(54) SELENIUM PRELOADED CATHODE FOR ALKALI METAL-SELENIUM SECONDARY BATTERY AND PRODUCTION PROCESS

(71) Applicant: Nanotek Instruments, Inc., Dayton, OH (US)

(72) Inventors: Hui He, Dayton, OH (US); Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 0 days.

(21) Appl. No.: 15/947,190

(22) Filed: Apr. 6, 2018

(65) Prior Publication Data

US 2019/0312311 A1    Oct. 10, 2019

(51) Int. Cl.
| | |
|---|---|
| *H01M 10/0569* | (2010.01) |
| *C01B 32/23* | (2017.01) |
| *H01M 4/62* | (2006.01) |
| *H01M 4/38* | (2006.01) |
| *C01B 32/192* | (2017.01) |
| *C01B 32/198* | (2017.01) |
| *C01B 32/225* | (2017.01) |

(Continued)

(52) U.S. Cl.
CPC ......... *H01M 10/0569* (2013.01); *B82Y 30/00* (2013.01); *B82Y 40/00* (2013.01); *C01B 32/192* (2017.08); *C01B 32/198* (2017.08); *C01B 32/225* (2017.08); *C01B 32/23* (2017.08); *H01M 4/382* (2013.01); *H01M 4/623* (2013.01); *H01M 4/625* (2013.01); *H01M 4/627* (2013.01)

(58) Field of Classification Search
None
See application file for complete search history.

(56) References Cited

U.S. PATENT DOCUMENTS

| | | |
|---|---|---|
| 2,798,878 A | 7/1957 | Hummers |
| 7,071,258 B1 | 7/2006 | Jang et al. |
| 9,812,736 B2 | 11/2017 | He et al. |

(Continued)

OTHER PUBLICATIONS

Peng et al, "Reduced graphene oxide encapsulated selenium nanoparticles for high-power lithium-selenium battery cathode", Journal of Power Sources 288 (2015) 214-220, available at www.elsevier.com/locate/jpowsour (Year: 2015).*

(Continued)

*Primary Examiner* — Scott J. Chmielecki

(57) ABSTRACT

A method of producing a pre-selenized (selenium-preloaded) active cathode layer for a rechargeable alkali metal-selenium cell; the method comprising: (a) Preparing an integral layer of porous graphitic structure having a specific surface area greater than 100 $m^2/g$; (b) Preparing an electrolyte comprising a solvent and a selenium source; (c) Preparing an anode; and (d) Bringing the integral layer and the anode in ionic contact with the electrolyte and imposing an electric current between the anode and the integral layer (serving as a cathode) to electrochemically deposit nanoscaled selenium particles or coating on the graphene surfaces. The selenium particles or coating have a thickness or diameter smaller than 20 nm (preferably <10 nm, more preferably <5 nm or even <3 nm) and occupy a weight fraction of at least 70% (preferably >90% or even >95%).

36 Claims, 7 Drawing Sheets

(51) Int. Cl.
B82Y 30/00 (2011.01)
B82Y 40/00 (2011.01)

(56) References Cited

U.S. PATENT DOCUMENTS

| | | |
|---|---|---|
| 2005/0271574 A1 | 12/2005 | Jang et al. |
| 2008/0048152 A1 | 2/2008 | Jang et al. |
| 2015/0064575 A1 | 3/2015 | He et al. |
| 2018/0090751 A1* | 3/2018 | Xu ........................ H01M 10/054 |

OTHER PUBLICATIONS

Gu et al, "Multifunctional Nitrogen-Doped Loofah Sponge Carbon Blocking Layer for High-Performance Rechargeable Lithium Batteries", ACS Appl. Mater. Interfaces 2016, 8, 15991-16001, available at www.acsami.org (Year: 2016).*

Gu et al, "Highly Reversible Li—Se Batteries with Ultra-Lightweight N,SCodoped Graphene Blocking Layer", Nano-Micro Lett. (2018) 10:59, available at https://doi.org/10.1007//s40820-018-0213-5 (Year: 2018).*

PCT/US2019/26000 International Search Report dated Aug. 6, 2019, 10 pages.

* cited by examiner

SELENIUM PRELOADED CATHODE FOR ALKALI METAL-SELENIUM SECONDARY BATTERY AND PRODUCTION PROCESS

FIELD OF THE INVENTION

The present invention provides a unique cathode composition and structure in a secondary or rechargeable alkali metal-selenium battery, including the lithium-selenium battery and sodium-selenium battery, and a process for producing same.

BACKGROUND

Rechargeable lithium-ion (Li-ion) and lithium metal batteries (including Li-sulfur and Li metal-air batteries) are considered promising power sources for electric vehicle (EV), hybrid electric vehicle (HEV), and portable electronic devices, such as lap-top computers and mobile phones. Lithium as a metal element has the highest capacity (3,861 mAh/g) compared to any other metal or metal-intercalated compound as an anode active material (except $Li_{4.4}Si$, which has a specific capacity of 4,200 mAh/g). Hence, in general, Li metal batteries have a significantly higher energy density than lithium ion batteries.

Historically, rechargeable lithium metal batteries were produced using non-lithiated compounds having relatively high specific capacities, such as $TiS_2$, $MoS_2$, $MnO_2$, $COO_2$, and $V_2O_5$, as the cathode active materials, which were coupled with a lithium metal anode. When the battery was discharged, lithium ions were transferred from the lithium metal anode through the electrolyte to the cathode, and the cathode became lithiated. Unfortunately, upon repeated charges/discharges, the lithium metal resulted in the formation of dendrites at the anode that ultimately grew to penetrate through the separator, causing internal shorting and explosion. As a result of a series of accidents associated with this problem, the production of these types of secondary batteries was stopped in the early 1990's, giving ways to lithium-ion batteries.

In lithium-ion batteries, pure lithium metal sheet or film was replaced by carbonaceous materials as the anode. The carbonaceous material absorbs lithium (through intercalation of lithium ions or atoms between graphene planes, for instance) and desorbs lithium ions during the re-charge and discharge phases, respectively, of the lithium ion battery operation. The carbonaceous material may comprise primarily graphite that can be intercalated with lithium and the resulting graphite intercalation compound may be expressed as $Li_xC_6$, where x is typically less than 1.

Although lithium-ion (Li-ion) batteries are promising energy storage devices for electric drive vehicles, state-of-the-art Li-ion batteries have yet to meet the cost and performance targets. Li-ion cells typically use a lithium transition-metal oxide or phosphate as a positive electrode (cathode) that de/re-intercalates $Li^+$ at a high potential with respect to the carbon negative electrode (anode). The specific capacity of lithium transition-metal oxide or phosphate based cathode active material is typically in the range from 140-180 mAh/g. As a result, the specific energy of commercially available Li-ion cells is typically in the range from 120-240 Wh/kg, most. These specific energy values are two to three times lower than what would be required for battery-powered electric vehicles to be widely accepted.

With the rapid development of hybrid (HEV), plug-in hybrid electric vehicles (HEV), and all-battery electric vehicles (EV), there is an urgent need for anode and cathode materials that provide a rechargeable battery with a significantly higher specific energy, higher energy density, higher rate capability, long cycle life, and safety. Two of the most promising energy storage devices are the lithium-sulfur (Li—S) cell and lithium-selenium (Li—Se) cell since the theoretical capacity of Li is 3,861 mAh/g, that of S is 1,675 mAh/g, and that of Se is 675 mAh/g. Compared with conventional intercalation-based Li-ion batteries, Li—S and Li—Se cells have the opportunity to provide a significantly higher energy density (a product of capacity and voltage). With a significantly higher electronic conductivity, Se is a more effective cathode active material and, as such, Li—Se potentially can exhibit a higher rate capability.

However, Li—Se cell is plagued with several major technical problems that have hindered its widespread commercialization:

(1) All prior art Li—Se cells have dendrite formation and related internal shorting issues;

(2) The cell tends to exhibit significant capacity decay during discharge-charge cycling. This is mainly due to the high solubility of selenium and lithium poly selenide anions formed as reaction intermediates during both discharge and charge processes in the polar organic solvents used in electrolytes. During cycling, the anions can migrate through the separator to the Li negative electrode whereupon they are reduced to solid precipitates, causing active mass loss. In addition, the solid product that precipitates on the surface of the positive electrode during discharge becomes electrochemically irreversible, which also contributes to active mass loss. This phenomenon is commonly referred to as the Shuttle Effect. This process leads to several problems: high self-discharge rates, loss of cathode capacity, corrosion of current collectors and electrical leads leading to loss of electrical contact to active cell components, fouling of the anode surface giving rise to malfunction of the anode, and clogging of the pores in the cell membrane separator which leads to loss of ion transport and large increases in internal resistance in the cell.

(3) Presumably, nanostructured mesoporous carbon materials could be used to hold the Se or lithium polyselenide in their pores, preventing large out-flux of these species from the porous carbon structure through the electrolyte into the anode. However, the fabrication of the proposed highly ordered mesoporous carbon structure requires a tedious and expensive template-assisted process. It is also challenging to load a large proportion of selenium into these mesoscaled pores using a physical vapor deposition or solution precipitation process. Typically the maximum loading of Se in these porous carbon structures is less than 50%.

Despite the various approaches proposed for the fabrication of high energy density Li—Se cells, there remains a need for cathode materials, production processes, and cell operation methods that retard the out-diffusion of Se or lithium polyselenide from the cathode compartments into other components in these cells, improve the utilization of electro-active cathode materials (Se utilization efficiency), and provide rechargeable Li—Se cells with high capacities over a large number of cycles.

Most significantly, lithium metal (including pure lithium, lithium alloys of high lithium content with other metal elements, or lithium-containing compounds with a high lithium content; e.g. >80% or preferably >90% by weight Li) still provides the highest anode specific capacity as compared to essentially all other anode active materials (except pure silicon, but silicon has pulverization issues).

Lithium metal would be an ideal anode material in a lithium-selenium secondary battery if dendrite related issues could be addressed.

Sodium metal (Na) and potassium metal (K) have similar chemical characteristics to Li and the selenium cathode in sodium-selenium cells (Na—Se batteries) or potassium-selenium cells (K—Se) face the same issues observed in Li—S batteries, such as: (i) low active material utilization rate, (ii) poor cycle life, and (iii) low Coulumbic efficiency. Again, these drawbacks arise mainly from insulating nature of Se, dissolution of polyselenide intermediates in liquid electrolytes (and related Shuttle effect), and large volume change during charge/discharge.

Hence, an object of the present invention is to provide a rechargeable Li—Se battery that exhibits an exceptionally high specific energy or high energy density. One particular technical goal of the present invention is to provide a Li metal-selenium or Li ion-selenium cell with a cell specific energy greater than 300 Wh/kg, preferably greater than 350 Wh/kg, and more preferably greater than 400 Wh/kg (all based on the total cell weight).

It may be noted that in most of the open literature reports (scientific papers) and patent documents, scientists or inventors choose to express the cathode specific capacity based on the selenium or lithium polyselenide weight alone (not the total cathode composite weight), but unfortunately a large proportion of non-active materials (those not capable of storing lithium, such as conductive additive and binder) is typically used in their Li—Se cells. For practical use purposes, it is more meaningful to use the cathode composite weight-based capacity value.

A specific object of the present invention is to provide a rechargeable lithium-selenium cell based on rational materials and battery designs that overcome or significantly reduce the following issues commonly associated with conventional Li—Se cells: (a) dendrite formation (internal shorting); (b) low electric and ionic conductivities of selenium, requiring large proportion (typically 30-55%) of non-active conductive fillers and having significant proportion of non-accessible or non-reachable selenium or lithium polyselenide); (c) dissolution of lithium polyselenide in electrolyte and migration of dissolved lithium polyselenide from the cathode to the anode (which irreversibly react with lithium at the anode), resulting in active material loss and capacity decay (the shuttle effect); and (d) short cycle life.

In addition to overcoming the aforementioned problems, another object of the present invention is to provide a simple, cost-effective, and easy-to-implement approach to preventing potential Li metal dendrite-induced internal short circuit and thermal runaway problems in Li metal-selenide batteries.

SUMMARY OF THE INVENTION

The present invention provides a unique cathode composition and structure in a secondary or rechargeable alkali metal-selenium battery, including the lithium-selenium battery and sodium-selenium battery. The lithium-selenium battery can include the lithium metal-selenium battery (having lithium metal as the anode active material and selenium as the cathode active material) and the lithium ion-selenium battery (e.g. Si or graphite as the anode active material and selenium as the cathode active material). The sodium-selenium battery can include the sodium metal-selenium battery (having sodium metal as the anode active material and selenium as the cathode active material) and the sodium ion-selenium battery (e.g. hard carbon as the anode active material and selenium as the cathode active material).

The present invention provides an electrochemical method of producing a pre-selenized active cathode layer for use in a rechargeable alkali metal-selenium cell. The term "pre-selenized" means pre-loading selenium into a cathode active material before this cathode active material is incorporated into a battery cell (if this pre-selenization procedure is conducted outside of the intended lithium-selenium cell) or before the battery cell is operated to provide power to an external device (if this pre-selenization procedure is conducted in situ inside the intended lithium-selenium cell during the first charge cycle).

Such an electrochemical method is surprisingly capable of uniformly depositing an ultra-thin selenium (Se) coating layer or ultra-small small Se particles (<20 nm, more preferably and typically <10 nm, most typically and preferably <5 nm, or even <3 nm) on massive graphene surfaces, yet achieving a large proportion of Se (the cathode active material) relative to the supporting substrate (graphene or exfoliated graphite materials). These electrochemically deposited Se coating or particles remain well-adhered to the graphene surfaces during repeated charges/discharges, enabling an unusually high long cycle life. The ultra-thin dimensions also enable high storing/releasing rates of alkali metal ions ($Li^+$, $Na^+$, and/or $K^+$) and, hence, exceptional rate capability or power density.

For the purpose of describing the preferred embodiments of the instant invention, Li ions, Li metal, and Li—Se cells are used as examples. But, the same or similar procedures are applicable to other alkali metals and alkali metal-selenium cells (e.g. Na—Se cells and K—Se cells) This method comprises the following four elements, (a)-(d):

a) Preparing an integral layer of porous graphene or graphitic structure having massive graphene surfaces with a specific surface area greater than 100 $m^2/g$. The porous graphitic structure has a specific surface area preferably >500 $m^2/g$ and more preferably >700 $m^2/g$, and most preferably >1,000 $m^2/g$.

The layer of porous graphitic structure contains a graphene material selected from pristine graphene, graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, or a combination thereof. Alternatively or additionally, the graphene structure contains an exfoliated graphite material selected from exfoliated graphite worms, expanded graphite flakes, or recompressed graphite worms or flakes. The graphene structure comprises multiple sheets or flakes of a graphene material or exfoliated graphite material that are intersected or interconnected to form the integral layer with or without a binder to bond the multiple sheets together, and with or without a conductive filler being included in the integral layer. It is surprising to discover that multiple graphene sheets can be packed together to form an electrode layer of high structural integrity without utilizing a binder resin (effectively reducing the proportion of non-active materials in the cathode). These multiple sheets or flakes, along with the optional ingredients (binder, conductive additives, etc.), are combined to form a porous graphitic structure that must still have a specific surface area greater than 100 m²/g (preferably >500 m²/g and more preferably >700 m²/g, and most preferably >1,000 m²/g).

The layer of porous graphitic structure contains 0-49% (preferably 0-30%, more preferably 0-20%, and further preferably 0-10%) by weight of selenium or selenium-containing compound pre-loaded therein prior to the current electrochemical deposition), based on the total weights of all ingredients in the layer. Although not preferred, one can pre-load 0.01% to 49% of S on graphene surfaces.

b) Preparing an electrolyte comprising a solvent (preferably organic solvent and/or ionic liquid) and a selenium source dissolved or dispersed in the solvent;

c) Preparing an anode (this anode layer can be an anode active material layer in an intended Li—Se cell or an electrode in an external chamber/reactor that is external or unrelated to the intended Li—Se cell); and d) Bringing the integral layer of porous graphitic structure and the anode in ionic contact with the electrolyte (e.g. immersing all these components in a chamber or reactor being external to the intended Li—Se cell, or encasing these three components inside the Li—Se cell) and imposing an electric current between the anode and the integral layer of porous graphitic structure (serving as a cathode) with a sufficient current density for a sufficient period of time to electrochemically deposit nanoscaled selenium particles or coating on the graphene surfaces to form the pre-selenized active cathode layer, wherein the particles or coating have a thickness or diameter smaller than 20 nm (preferably <10 nm, more preferably <5 nm, and further preferably <3 nm) and wherein the nanoscaled selenium particles or coating occupy a weight fraction of at least 70% (preferably >80%, more preferably >90%, and most preferably >95%) based on the total weights of the selenium particles or coating and the graphene material combined.

When these three components (porous graphitic structure, anode, and electrolyte) are encased inside the Li—Se cell, nano selenium is electrochemically deposited in situ in the cathode inside the battery cell. When the three components are implemented in an external container (chamber or reactor outside of the intended Li—S battery cell), nano selenium is deposited onto graphene surfaces through the "external electrochemical deposition" route.

In one preferred embodiment, the selenium source is selected from $M_xSe_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof. In a desired embodiment, the metal element M is selected from Li, Na, K, Mg, Zn, Cu, Ti, Ni, Co, Fe, or Al. In a particularly desired embodiment, $M_xSe_y$ is selected from $Li_2Se_6$, $Li_2Se_7$, $Li_2Se_8$, $Li_2Se_9$, $Li_2Se_{10}$, $Na_2Se_6$, $Na_2Se_7$, $Na_2Se_8$, $Na_2Se_9$, $Na_2Se_{10}$, $K_2Se_6$, $K_2Se_7$, $K_2Se_8$, $K_2Se_9$, $K_2Se_{10}$, or a combination thereof.

In one embodiment, the anode comprises an anode active material selected from an alkali metal, an alkaline metal, a transition metal, a metal from groups 13 to 17 of the periodic table, or a combination thereof.

In one embodiment, the method further comprises a procedure of depositing an element Z to the porous graphitic structure wherein element Z is mixed with selenium or formed as discrete Z coating or particles having a dimension less than 100 nm (preferably <20 nm, further preferably <10 nm, even more preferably <5 nm, and most preferably <3 nm) and Z element is selected from Sn, Sb, Bi, S, and/or Te. The procedure of depositing element Z may be preferably selected from electrochemical deposition, chemical deposition, or solution deposition. We have discovered that the addition of some amount (less than 50%, preferably less than 20% by weight) of Sn, Sb, Bi, S, or Te can lead to improved cathode conductivity and/or higher specific capacity.

The electrolyte may further comprise a metal salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis(oxalato)borate (Li-BOB), lithium oxalyldifluoroborate ($LiBF_2C_2O_4$), lithium oxalyldifluoroborate ($LiBF_2C_2O_4$), lithium nitrate ($LiNO_3$), Li-Fluoroalkyl-Phosphates ($LiPF_3(CF_2CF_3)_3$), lithium bisperfluoro-ethysulfonylimide (LiBETI), lithium bis(trifluoromethanesulphonyl)imide, lithium bis(fluorosulphonyl) imide, lithium trifluoromethanesulfonimide (LiTFSI), an ionic liquid-based lithium salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide potassium ($KN(CF_3SO_2)_2$), or a combination thereof.

The solvent may be selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof.

In one preferred embodiment, the electrochemical deposition is conducted before the cathode active layer is incorporated into an intended lithium-selenium (Li—Se) battery cell, Na—Se cell, or K—Se cell. In other words, the anode, the electrolyte, and the integral layer of porous graphitic structure (serving as a cathode layer) are disposed in an external container outside of a lithium-selenium cell. The needed apparatus is similar to an electro-plating system. The step of electrochemically depositing nanoscaled selenium particles or coating on the graphene surfaces is conducted outside the lithium-selenium cell and prior to the battery cell fabrication.

In another embodiment, the anode, the electrolyte, and the integral layer of porous graphitic structure are included inside an alkali metal-selenium cell (e.g. lithium-selenium cell). In other words, the battery cell itself is an electrochemical deposition system for pre-selenization of the cathode and the step of electrochemically depositing nanoscaled selenium particles or coating on the graphene surfaces occurs after the lithium-selenium cell is fabricated. This electrochemical deposition procedure is conducted during the first charge cycle of the Li—Se cell.

A special and highly advantageous feature of the inventive method is the notion that this method enables the selenium to be deposited in a thin coating or ultra-fine particle form (thus, providing ultra-short lithium ion diffusion paths and, hence, ultra-fast reaction times for fast battery charges and discharges) while achieving a relatively high proportion of selenium (the active material responsible for storing lithium) and, thus, high specific lithium storage capacity of the resulting cathode active layer in terms of high mAh/g (based on the total weight of the cathode layer, including the masses of the active material, Se, supporting graphene sheets, binder resin, and conductive filler combined). It is of significance to note that one might be able to use a prior art procedure to deposit small Se particles, but cannot achieve a high Se proportion at the same time, or to achieve a high proportion of Se, but only in large particles or thick film form. The prior art procedures have not been able to achieve both at the same time.

This is why it is such an unexpected and highly advantageous thing to achieve a high selenium loading and yet, concurrently, form an ultra-thin coating or ultra-small diameter particles of selenium. This has not been possible with any prior art selenium loading techniques. For instance, we have been able to deposit nanoscaled selenium particles or coating that occupy a >90% weight fraction of the cathode layer and yet maintain a coating thickness or particle diameter<3 nm. This is quite a feat in the art of lithium-selenium batteries. In another example, we have achieved a >95% Se loading at an average Se coating thickness of 4.5-7.1 nm. These ultra-thin dimensions (3-7 nm) enable facile cathode reactions and nearly perfect selenium utilization efficiency, something that no prior worker has been able to achieve.

The present invention also provides a pre-selenized active cathode layer produced by the above-described method and a rechargeable alkali metal-selenium cell (e.g. lithium-selenium battery cell) that contains such a cathode layer. Preferably, the graphene sheets in the integral layer of porous graphitic structure are chemically bonded together with an adhesive resin. Typically, such a rechargeable alkali metal-selenium cell comprises an anode active material layer, an optional anode current collector, a porous separator and/or an electrolyte, a pre-selenized active cathode layer, and an optional cathode current collector.

In the invented rechargeable alkali metal-selenium cell, the electrolyte may be selected from polymer electrolyte, polymer gel electrolyte, composite electrolyte, ionic liquid electrolyte, non-aqueous liquid electrolyte, soft matter phase electrolyte, solid-state electrolyte, or a combination thereof. The electrolyte preferably contains an alkali metal salt (lithium salt, sodium salt, and/or potassium salt) selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-fluoroalkyl-phosphates ($LiPF_3(CF_2CF_3)_3$), lithium bisperfluoroethysulfonylimide (LiBETI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide potassium ($KN(CF_3SO_2)_2$), or a combination thereof.

Ionic liquids (ILs) are a new class of purely ionic, salt-like materials that are liquid at unusually low temperatures. The official definition of ILs uses the boiling point of water as a point of reference: "Ionic liquids are ionic compounds which are liquid below 100° C.". A particularly useful and scientifically interesting class of ILs is the room temperature ionic liquid (RTIL), which refers to the salts that are liquid at room temperature or below. RTILs are also referred to as organic liquid salts or organic molten salts. An accepted definition of an RTIL is any salt that has a melting temperature lower than ambient temperature. Common cations of RTILs include, but are not limited to, tetraalkylammonium, di-, tri-, or tetra-alkylimidazolium, alkylpyridinium, dialkylpyrrolidinium, dialkylpiperidinium, tetraalkylphosphonium, and trialkyl-sulfonium. Common anions of RTILs include, but are not limited to, $BF_4^-$, $B(CN)_4^-$, $CH_3BF_3^-$, $CH_2CHBF_3^-$, $CF_3BF_3^-$, $C_2F_5BF_3^-$, n-$C_3F_7BF_3^-$, n-$C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc.

As examples, the solvent may be selected from ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene or methyl acetate (MA), fluoroethylene carbonate (FEC), vinylene carbonate (VC), allyl ethyl carbonate (AEC), 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, room temperature ionic liquid, or a combination thereof.

In an embodiment, the rechargeable alkali metal-selenium cell may further comprise a layer of protective material disposed between the anode and the porous separator, wherein the protective material is a conductor to the intended alkali metal ions (e.g. $Li^+$, $Na^+$, or $K^+$). In a preferred embodiment, the protective material consists of a solid electrolyte.

In an embodiment, the anode active material layer contains an anode active material selected from lithium metal, sodium metal, potassium metal, a lithium metal alloy, sodium metal alloy, potassium metal alloy, a lithium intercalation compound, a sodium intercalation compound, a potassium intercalation compound, a lithiated compound, a sodiated compound, a potassium-doped compound, lithiated titanium dioxide, lithium titanate, lithium manganate, a lithium transition metal oxide, $Li_4Ti_5O_{12}$, or a combination thereof. This anode active material layer can be optionally coated on an anode current collector (such as Cu foil).

In another embodiment, the lithium-selenium battery cell is an alkali metal ion-selenium cell (e.g. lithium ion-selenium cell, sodium-ion selenium cell, potassium-ion selenium cell) wherein the anode active material layer contains an anode active material selected from the group consisting of: (a) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd), and lithiated versions thereof, (b) alloys or intermetallic compounds of Si, Ge, Sn, Pb, Sb, Bi, Zn, Al, or Cd with other elements, and lithiated versions thereof, wherein said alloys or compounds are stoichiometric or non-stoichiometric; (c) oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites, and lithiated versions thereof; (d) salts and hydroxides of Sn and lithiated versions thereof; (e) carbon or graphite materials and prelithiated versions thereof; and combinations thereof.

We have discovered that the use of these types of anode active materials (instead of lithium metal foil, for instance) can eliminates the dendrite issue. The resulting battery cells are herein referred to as lithium ion selenium cells, a new breed of lithium-selenium cells.

Although in general not required, the cathode active layer of the rechargeable alkali metal-selenium cell may contain a conductive filler selected from the group consisting of electrospun nanofibers, vapor-grown carbon or graphite nanofibers, carbon or graphite whiskers, carbon nanotubes, carbon nanowires, expanded graphite flakes, metal nanowires, metal-coated nanowires or nanofibers, conductive polymer-coated nanowires or nanofibers, and combinations thereof. In an embodiment, the conductive filler comprises a fiber selected from the group consisting of an electrically conductive electrospun polymer fiber, electrospun polymer nanocomposite fiber comprising a conductive filler, nano carbon fiber obtained from carbonization of an electrospun polymer fiber, electrospun pitch fiber, and combinations thereof.

In the invented rechargeable alkali metal-selenium cell, the graphene material preferably comprises nanographene sheets or platelets with a thickness less than 10 nm, preferably <5 nm, further preferably <2 nm, and most preferably <1 nm. The nanographene sheets or platelets are preferably selected from single-layer or few-layer pristine graphene, wherein few-layer is defined as 10 planes of hexagonal carbon atoms or less. Thinner graphene sheets (particularly single-layer or few-layer sheets) make it possible to make a porous graphitic structure that has a specific surface area greater than 500 $m^2/g$, preferably >700 $m^2/g$, and more preferably >1,000 $m^2/g$, and most preferably >1,500 $m^2/g$. The ultra-thin sheets of various graphene materials make it possible to produce a cathode active layer having massive surfaces to support thin Se coating deposited thereon. This in turn makes it possible to make good or full utilization of the cathode active material (i.e. Se). We have achieved a cathode active material utilization rate>90% or even >99%. In the rechargeable alkali metal-selenium cell, the cathode contains at least 70% by weight of selenium (preferably >80% and further preferably >90%) based on the total weight of said porous graphitic structure and selenium combined In the rechargeable alkali metal-selenium cell, the binder material (if desired) is selected from a resin, a conductive polymer, coal tar pitch, petroleum pitch, mesophase pitch, coke, or a derivative thereof.

In the rechargeable alkali metal-selenium cell, the cathode may further comprise additional selenium, selenium-containing molecule, selenium-containing compound, selenium-carbon polymer, or a combination thereof, which is loaded before the cell is manufactured.

The presently invented cell provides a reversible specific capacity of typically no less than 400 mAh per gram based on the total weight of the integral cathode layer (the weights of Se, graphene material, optional binder, and optional conductive filler combined), not just based on the active material weight (selenium) only. Most of the scientific papers and patent documents reported their selenium cathode specific capacity data based on selenium weight only.

More typically and preferably, the reversible specific capacity is no less than 500 mAh per gram and often exceeds 550 or even 600 mAh per gram of entire cathode layer. The high specific capacity of the presently invented cathode, when in combination with a lithium anode, leads to a cell specific energy of no less than 300 Wh/kg based on the total cell weight including anode, cathode, electrolyte, separator, and current collector weights combined. This specific energy value is not based on the cathode active material weight or cathode layer weight only (as sometimes did in open literature or patent applications); instead, this is based on entire cell weight. In many cases, the cell specific energy is higher than 350 Wh/kg and, in some examples, exceeds 400 Wh/kg.

These and other advantages and features of the present invention will become more transparent with the description of the following best mode practice and illustrative examples.

DETAILED DESCRIPTION OF PREFERRED EMBODIMENTS

Figure 1A:
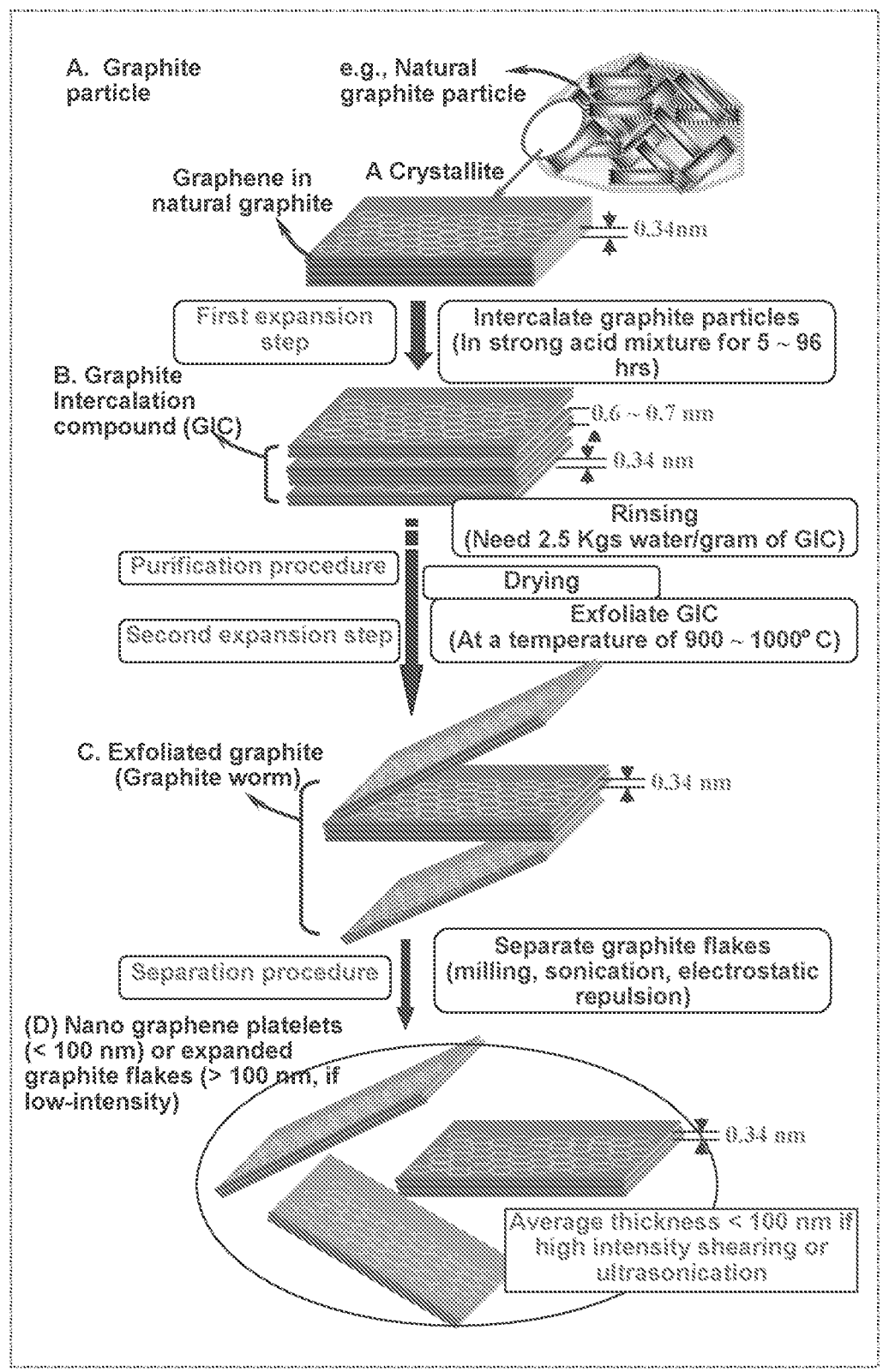
FIG. 1(A) Schematic of the commonly used procedures for producing exfoliated graphite worms and graphene sheets.
Figure 1:
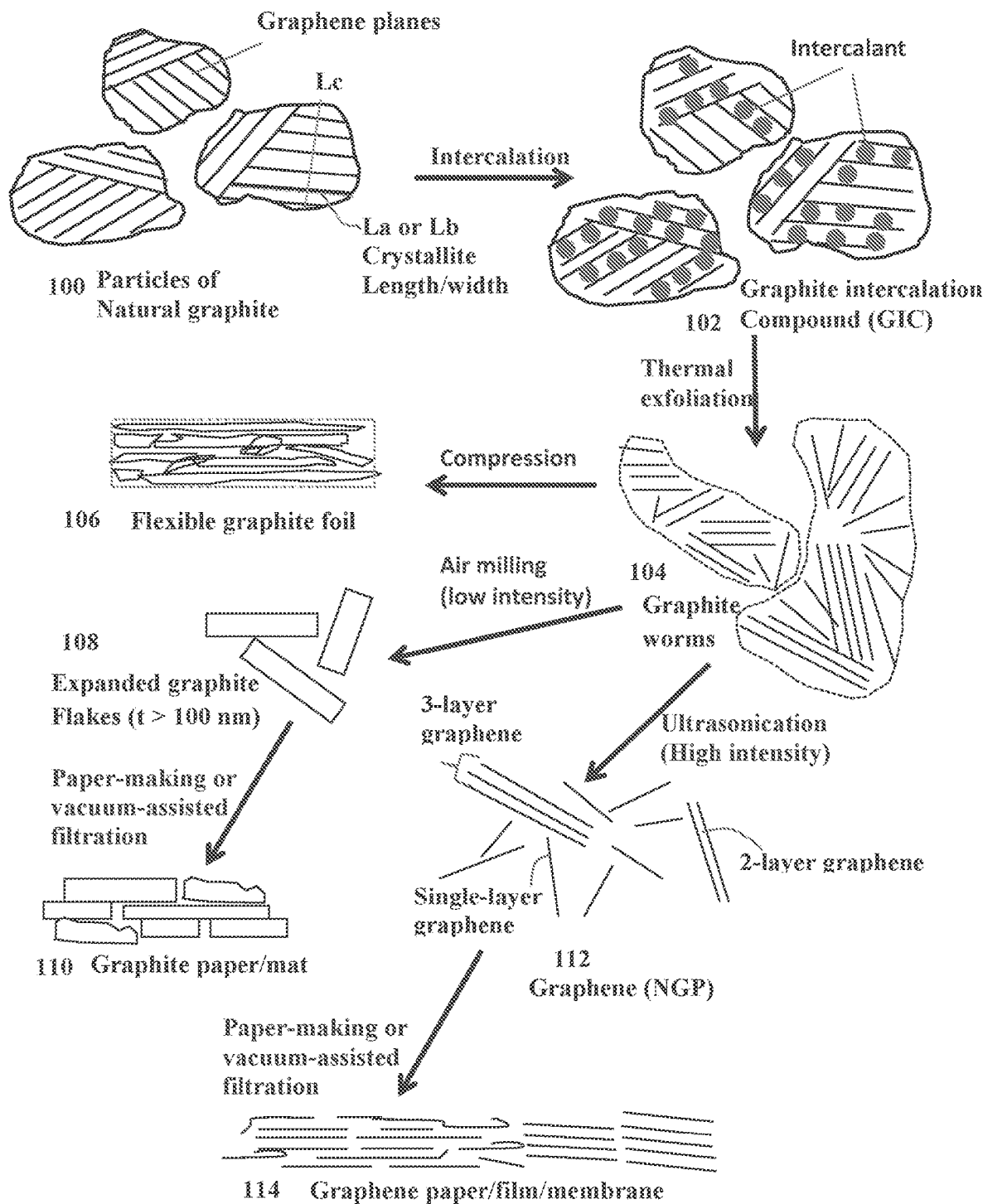
FIG. 1(B) Another schematic drawing to illustrate the process for producing exfoliated graphite, expanded graphite flakes, and graphene sheets.

For convenience, the following discussion of preferred embodiments is primarily based on cathodes for Li—Se cells, but the same or similar methods are applicable to deposition of Se in the cathode for the Na—Se and K—Se cells. Examples are presented for Li—Se cells, Na—Se cells, and K—Se cells.

A. Alkali Metal-Selenium Cells (Using Lithium-Selenium Cells as an Example)

The specific capacity and specific energy of a Li—Se cell (or Na—Se, or K—Se cell) are dictated by the actual amount of selenium that can be implemented in the cathode active layer (relative to other non-active ingredients, such as the binder resin and conductive filler) and the utilization rate of this selenium amount (i.e. the utilization efficiency of the cathode active material or the actual proportion of S that actively participates in storing and releasing lithium ions). A high-capacity and high-energy Li—Se requires a high amount of Se in the cathode active layer (i.e. relative to the amounts of non-active materials, such as the binder resin, conductive additive, and other modifying or supporting materials) and a high Se utilization efficiency). The present invention provides such a cathode active layer and a method of producing such a cathode active layer, which is a pre-selenized active cathode layer. This method comprises the following four steps, (a)-(d):

a) preparing an integral layer of porous graphitic structure having massive graphene surfaces with a specific surface area greater than 100 $m^2/g$ (these surfaces must be accessible to electrolyte). The porous graphitic structure have a specific surface area preferably >500 $m^2/g$ and more preferably >700 $m^2/g$, and most preferably >1,000 $m^2/g$.

b) preparing an electrolyte comprising a solvent (non-aqueous solvent, such as organic solvent and or ionic liquid) and a selenium source dissolved or dispersed in the solvent;

c) preparing an anode; and d) bringing the integral layer of porous graphitic structure and the anode in ionic contact with the electrolyte (e.g. by immersing all these components in a chamber that is external to the intended Li—Se cell, or encasing these three components inside the Li—Se cell) and imposing an electric current between the anode and the integral layer of porous graphitic structure (serving as a cathode) with a sufficient current density for a sufficient period of time to electrochemically deposit nanoscaled selenium particles or coating on the graphene surfaces to form the pre-selenized active cathode layer.

The layer of porous graphitic structure recited in step (a) contains a graphene material or an exfoliated graphite material, wherein the graphene material is selected from pristine graphene, graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, or a combination thereof, and wherein the exfoliated graphite material is selected from exfoliated graphite worms, expanded graphite flakes, or recompressed graphite worms or flakes (must still exhibit a high specific surface area, >>100 $m^2/g$, accessible to electrolyte). The graphene structure comprises multiple sheets of a graphene material that are intersected or interconnected to form the integral layer with or without a binder to bond the multiple sheets together and with or without a conductive filler being included in the integral layer.

It is surprising to discover that multiple graphene sheets can be packed together to form an electrode layer of structural integrity without the need for a binder resin, and such a layer can hold its shape and functions during repeated charges and discharges of the resulting Li—Se cell.

The layer of porous graphitic structure contains 0-49% (preferably 0-30%, more preferably 0-30%, and further preferably 0-10%) by weight of selenium or selenium-containing compound pre-loaded therein, based on the weights of all ingredients in the layer prior to the step (d) of depositing selenium coating or particles on massive graphene sheet surfaces. Preferably, zero (0%) selenium or selenium-containing compound is pre-loaded into the porous graphitic structure since this pre-loaded material, if not done properly, can negatively impact the subsequent pre-selenization step.

The Se particles or coating have a thickness or diameter smaller than 20 nm (preferably <10 nm, more preferably <5 nm, and further preferably <3 nm) and wherein the nanoscaled selenium particles or coating occupy a weight fraction of at least 70% (preferably >80%, more preferably >90%, and most preferably >95%) based on the total weights of the selenium particles or coating and the graphene material combined. It is advantageous to deposit as much Se as possible yet still maintain ultra-thin thickness or diameter of the Se coating or particles (e.g. >80% and <3 nm; >90% and <5 nm; and >95% and <10 nm, etc.).

B. Production of Various Graphene and Exfoliated Graphite Materials

In a preferred embodiment, the graphene electrode material is selected from pristine graphene, graphene oxide, reduced graphene oxide, graphene fluoride, graphene chloride, graphene bromide, graphene iodide, hydrogenated graphene, nitrogenated graphene, chemically functionalized graphene, or a combination thereof. The electrode material may be selected from an exfoliated graphite material. The starting graphitic material for producing any one of the above graphene or exfoliated graphite materials may be selected from natural graphite, artificial graphite, mesophase carbon, mesophase pitch, mesocarbon microbead, soft carbon, hard carbon, coke, carbon fiber, carbon nanofiber, carbon nanotube, or a combination thereof.

Bulk natural graphite is a 3-D graphitic material with each graphite particle being composed of multiple grains (a grain being a graphite single crystal or crystallite) with grain boundaries (amorphous or defect zones) demarcating neighboring graphite single crystals. Each grain is composed of multiple graphene planes that are oriented parallel to one another. A graphene plane in a graphite crystallite is composed of carbon atoms occupying a two-dimensional, hexagonal lattice. In a given grain or single crystal, the graphene planes are stacked and bonded via van der Waal forces in the crystallographic c-direction (perpendicular to the graphene plane or basal plane). Although all the graphene planes in one grain are parallel to one another, typically the graphene planes in one grain and the graphene planes in an adjacent grain are inclined at different orientations. In other words, the orientations of the various grains in a graphite particle typically differ from one grain to another.

The constituent graphene planes of a graphite crystallite in a natural or artificial graphite particle can be exfoliated and extracted or isolated to obtain individual graphene sheets of hexagonal carbon atoms, which are single-atom thick, provided the inter-planar van der Waals forces can be overcome. An isolated, individual graphene plane of carbon atoms is commonly referred to as single-layer graphene. A stack of multiple graphene planes bonded through van der Waals forces in the thickness direction with an inter-graphene plane spacing of approximately 0.3354 nm is commonly referred to as a multi-layer graphene. A multi-layer graphene platelet has up to 300 layers of graphene planes (<100 nm in thickness), but more typically up to 30 graphene planes (<10 nm in thickness), even more typically up to 20 graphene planes (<7 nm in thickness), and most typically up to 10 graphene planes (commonly referred to as few-layer graphene in scientific community). Single-layer graphene and multi-layer graphene sheets are collectively called "nanographene platelets" (NGPs). Graphene sheets/platelets (collectively, NGPs) are a new class of carbon nanomaterial (a 2-D nanocarbon) that is distinct from the 0-D fullerene, the 1-D CNT or CNF, and the 3-D graphite. For the purpose of defining the claims and as is commonly understood in the art, a graphene material (isolated graphene sheets) is not (and does not include) a carbon nanotube (CNT) or a carbon nanofiber (CNF).

Our research group pioneered the development of graphene materials and related production processes as early as 2002: (1) B. Z. Jang and W. C. Huang, "Nano-scaled Graphene Plates," U.S. Pat. No. 7,071,258 (Jul. 4, 2006), application submitted on Oct. 21, 2002; (2) B. Z. Jang, et al. "Process for Producing Nano-scaled Graphene Plates," U.S. patent application Ser. No. 10/858,814 (Jun. 3, 2004) (U.S. Patent Pub. No. 2005/0271574); and (3) B. Z. Jang, A. Zhamu, and J. Guo, "Process for Producing Nano-scaled Platelets and Nanocomposites," U.S. patent application Ser. No. 11/509,424 (Aug. 25, 2006) (U.S. Patent Pub. No. 2008-0048152).

In one process, graphene materials are obtained by intercalating natural graphite particles with a strong acid and/or an oxidizing agent to obtain a graphite intercalation compound (GIC) or graphite oxide (GO), as illustrated in FIG. 1(A) and FIG. 1(B) (schematic drawings). The presence of chemical species or functional groups in the interstitial spaces between graphene planes in a GIC or GO serves to increase the inter-graphene spacing ($d_{002}$, as determined by X-ray diffraction), thereby significantly reducing the van der Waals forces that otherwise hold graphene planes together along the c-axis direction. The GIC or GO is most often produced by immersing natural graphite powder (100 in FIG. 1(B)) in a mixture of seleniumic acid, nitric acid (an oxidizing agent), and another oxidizing agent (e.g. potassium permanganate or sodium perchlorate). The resulting GIC (102) is actually some type of graphite oxide (GO) particles if an oxidizing agent is present during the intercalation procedure. This GIC or GO is then repeatedly washed and rinsed in water to remove excess acids, resulting in a graphite oxide suspension or dispersion, which contains discrete and visually discernible graphite oxide particles dispersed in water. In order to produce graphene materials, one can follow one of the two processing routes after this rinsing step, briefly described below:

Route 1 involves removing water from the suspension to obtain "expandable graphite," which is essentially a mass of dried GIC or dried graphite oxide particles. Upon exposure of expandable graphite to a temperature in the range from typically 800-1,050° C. for approximately 30 seconds to 2 minutes, the GIC undergoes a rapid volume expansion by a factor of 30-300 to form "graphite worms" (104), which are each a collection of exfoliated, but largely un-separated graphite flakes that remain interconnected.

In Route 1A, these graphite worms (exfoliated graphite or "networks of interconnected/non-separated graphite flakes") can be re-compressed to obtain flexible graphite sheets or foils (106) that typically have a thickness in the range from 0.1 mm (100 μm)-0.5 mm (500 μm). Alternatively, one may choose to use a low-intensity air mill or shearing machine to simply break up the graphite worms for the purpose of producing the so-called "expanded graphite flakes" (108) which contain mostly graphite flakes or platelets thicker than 100 nm (hence, not a nanomaterial by definition).

In Route 1B, the exfoliated graphite is subjected to high-intensity mechanical shearing (e.g. using an ultrasonicator, high-shear mixer, high-intensity air jet mill, or high-energy ball mill) to form separated single-layer and multi-layer graphene sheets (collectively called NGPs, 112), as disclosed in our U.S. application Ser. No. 10/858,814 (Jun. 3, 2004). Single-layer graphene can be as thin as 0.34 nm, while multi-layer graphene can have a thickness up to 100 nm, but more typically less than 10 nm (commonly referred to as few-layer graphene). Multiple graphene sheets or platelets may be made into a sheet of NGP paper using a paper-making process. This sheet of NGP paper is an example of the porous graphitic structure layer utilized in the presently invented process.

Route 2 entails ultrasonicating the graphite oxide suspension (e.g. graphite oxide particles dispersed in water) for the purpose of separating/isolating individual graphene oxide sheets from graphite oxide particles. This is based on the notion that the inter-graphene plane separation has been increased from 0.3354 nm in natural graphite to 0.6-1.1 nm in highly oxidized graphite oxide, significantly weakening the van der Waals forces that hold neighboring planes together. Ultrasonic power can be sufficient to further separate graphene plane sheets to form fully separated, isolated, or discrete graphene oxide (GO) sheets. These graphene oxide sheets can then be chemically or thermally reduced to obtain "reduced graphene oxides" (RGO) typically having an oxygen content of 0.001%-10% by weight, more typically 0.01%-5% by weight, most typically and preferably less than 2% by weight of oxygen.

For the purpose of defining the claims of the instant application, NGPs or graphene materials include discrete sheets/platelets of single-layer and multi-layer (typically less than 10 layers) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials.

Pristine graphene, in smaller discrete graphene sheets (typically 0.3 μm to 10 μm), may be produced by direct ultrasonication (also known as liquid phase exfoliation or production) or supercritical fluid exfoliation of graphite particles. These processes are well-known in the art.

The graphene oxide (GO) may be obtained by immersing powders or filaments of a starting graphitic material (e.g. natural graphite powder) in an oxidizing liquid medium (e.g. a mixture of seleniumic acid, nitric acid, and potassium permanganate) in a reaction vessel at a desired temperature for a period of time (typically from 0.5 to 96 hours, depending upon the nature of the starting material and the type of oxidizing agent used). As previously described above, the resulting graphite oxide particles may then be subjected to thermal exfoliation or ultrasonic wave-induced exfoliation to produce isolated GO sheets. These GO sheets can then be converted into various graphene materials by substituting —OH groups with other chemical groups (e.g. —Br, $NH_2$, etc.).

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished.

Interaction of $F_2$ with graphite at high temperature leads to covalent graphite fluorides (CF), or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultra-sonic treatment of a graphite fluoride in a liquid medium.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

The aforementioned features are further described and explained in detail as follows: As illustrated in FIG. 1(B), a graphite particle (e.g. 100) is typically composed of multiple graphite crystallites or grains. A graphite crystallite is made up of layer planes of hexagonal networks of carbon atoms. These layer planes of hexagonally arranged carbon atoms are substantially flat and are oriented or ordered so as to be substantially parallel and equidistant to one another in a particular crystallite. These layers of hexagonal-structured carbon atoms, commonly referred to as graphene layers or basal planes, are weakly bonded together in their thickness direction (crystallographic c-axis direction) by weak van der Waals forces and groups of these graphene layers are arranged in crystallites. The graphite crystallite structure is usually characterized in terms of two axes or directions: the c-axis direction and the a-axis (or b-axis) direction. The c-axis is the direction perpendicular to the basal planes. The a- or b-axes are the directions parallel to the basal planes (perpendicular to the c-axis direction).

A highly ordered graphite particle can consist of crystallites of a considerable size, having a length of $L_a$ along the crystallographic a-axis direction, a width of $L_b$ along the crystallographic b-axis direction, and a thickness $L_c$ along the crystallographic c-axis direction. The constituent graphene planes of a crystallite are highly aligned or oriented with respect to each other and, hence, these anisotropic structures give rise to many properties that are highly directional. For instance, the thermal and electrical conductivity of a crystallite are of great magnitude along the plane directions (a- or b-axis directions), but relatively low in the perpendicular direction (c-axis). As illustrated in the upper-left portion of FIG. 1(B), different crystallites in a graphite particle are typically oriented in different directions and, hence, a particular property of a multi-crystallite graphite particle is the directional average value of all the constituent crystallites.

Figure 2A:
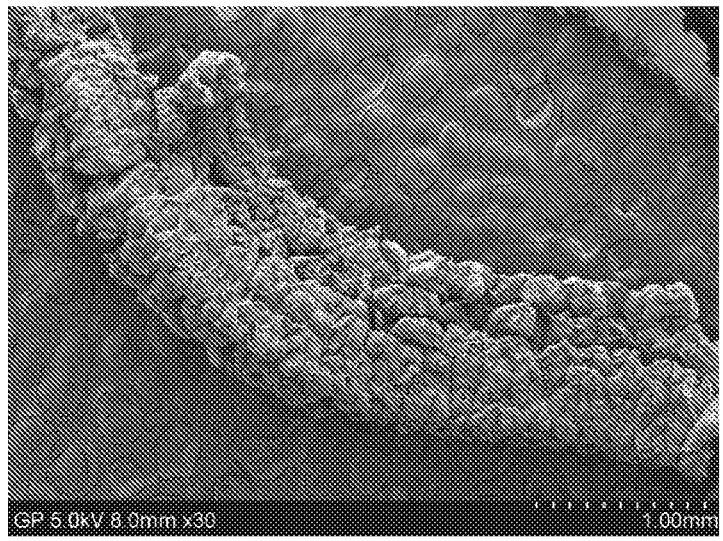
FIG. 2(A) SEM images of exfoliated graphite worms imaged at a low magnification.
Figure 2B:
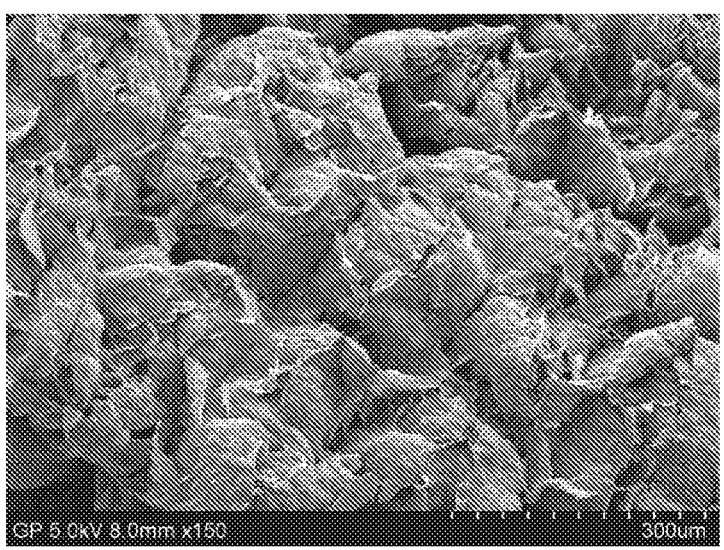
FIG. 2(B) same graphite worm as in (A), but taken at a higher magnification.
Figure 2C:
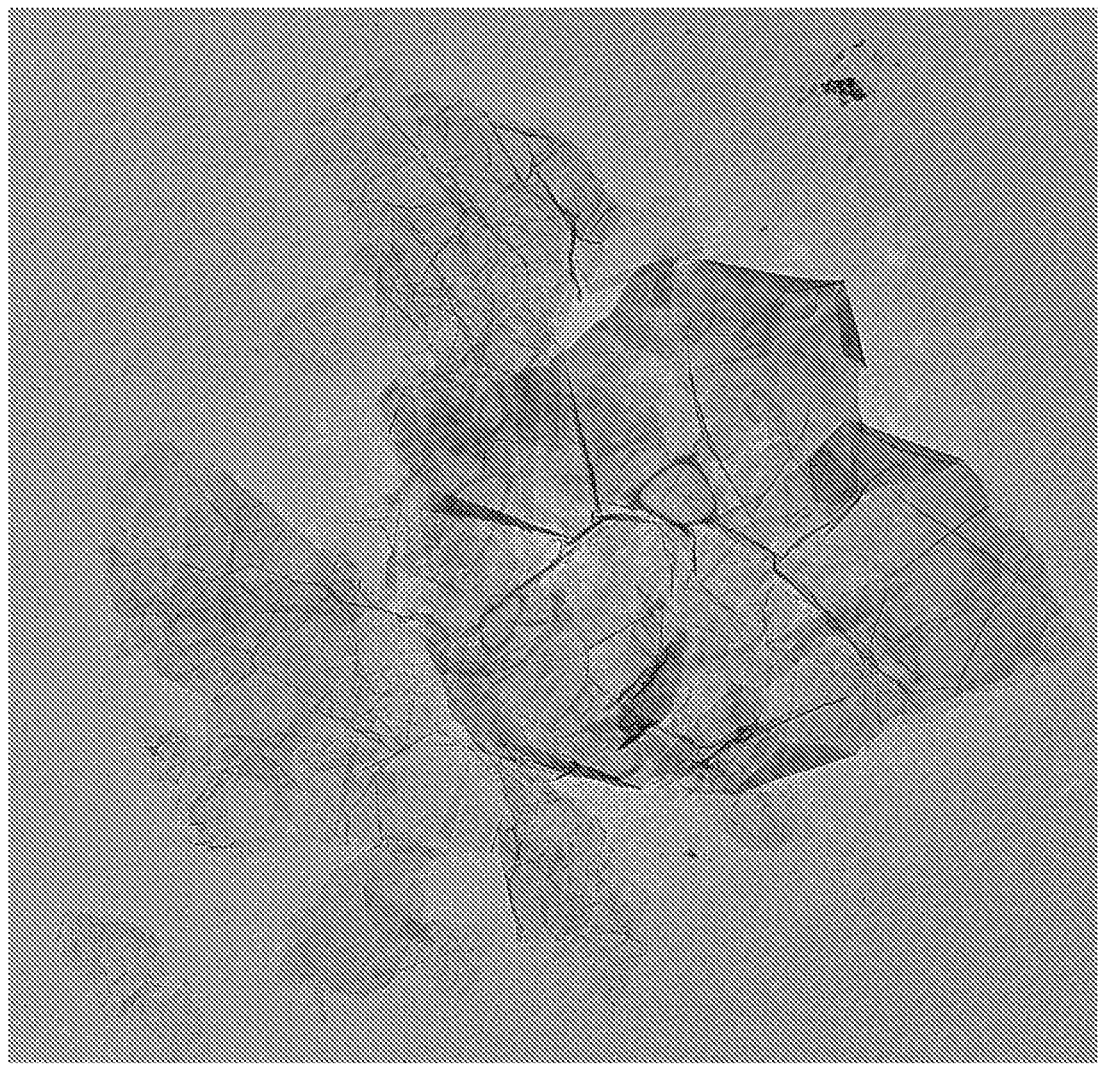
FIG. 2(C) TEM image of single-layer graphene sheets partially stacked together.

Due to the weak van der Waals forces holding the parallel graphene layers, natural graphite can be treated so that the spacing between the graphene layers can be appreciably opened up so as to provide a marked expansion in the c-axis direction, and thus form an expanded graphite structure in which the laminar character of the carbon layers is substantially retained. The process for manufacturing flexible graphite is well-known in the art. In general, flakes of natural graphite (e.g. 100 in FIG. 1(B)) are intercalated in an acid solution to produce graphite intercalation compounds (GICs, 102). The GICs are washed, dried, and then exfoliated by exposure to a high temperature for a short period of time. This causes the flakes to expand or exfoliate in the c-axis direction of the graphite up to 80-300 times of their original dimensions. The exfoliated graphite flakes are vermiform in appearance and, hence, are commonly referred to as graphite worms 104. These worms of graphite flakes which have been greatly expanded can be formed without the use of a binder into cohesive or integrated sheets of expanded graphite, e.g. webs, papers, strips, tapes, foils, mats or the like (typically referred to as "flexible graphite" 106) having a typical density of about 0.04-2.0 g/cm³ for most applications. Examples of exfoliated graphite worms (or, simply, graphite worms) are presented in FIG. 2(A) and FIG. 2(B).

Acids, such as seleniumic acid, are not the only type of intercalating agent (intercalant) that penetrate into spaces between graphene planes to obtain GICs. Many other types of intercalating agents, such as alkali metals (Li, K, Na, Cs, and their alloys or eutectics), can be used to intercalate graphite to stage 1, stage 2, stage 3, etc. Stage n implies one intercalant layer for every n graphene planes. For instance, a stage-1 potassium-intercalated GIC means there is one layer of K for every graphene plane; or, one can find one layer of K atoms inserted between two adjacent graphene planes in a G/K/G/K/G/KG . . . sequence, where G is a graphene plane and K is a potassium atom plane. A stage-2 GIC will have a sequence of GG/K/GG/K/GG/K/GG . . . and a stage-3 GIC will have a sequence of GGG/K/GGG/K/GGG . . . , etc. These GICs can then be brought in contact with water or water-alcohol mixture to produce exfoliated graphite and/or separated/isolated graphene sheets.

C. Production of Integral Layer of Porous Graphitic Structure

Several techniques can be employed to fabricate a conductive layer of porous graphitic structure (a web, mat, paper, or porous film, etc.), which is a monolithic body having desired interconnected pores that are accessible to liquid electrolyte.

In one prior art process, the exfoliated graphite (or mass of graphite worms) is heavily re-compressed by using a calendaring or roll-pressing technique to obtain flexible graphite foils (106 in FIG. 1(B)), which are typically 100-500 m thick. This conventional flexible graphite foil does not have a specific surface area>100 m²/g. Even though the flexible graphite foil is porous, most of these pores are not accessible to liquid electrolyte when immersed in an external electrochemical deposition chamber or incorporated in a lithium battery. For the preparation of a desired layer of porous graphene or graphitic structure, the compressive stress and/or the gap between rollers can be readily adjusted to obtain a desired layer of porous graphitic structure that has massive graphene surfaces (having a specific surface area>100 m$^2$/g) accessible to liquid electrolyte and available for receiving the selenium coating or nanoparticles deposited thereon.

Exfoliated graphite worms may be subjected to high-intensity mechanical shearing/separation treatments using a high-intensity air jet mill, high-intensity ball mill, or ultrasonic device to produce separated nanographene platelets (NGPs) with all the graphene platelets thinner than 100 nm, mostly thinner than 10 nm, and, in many cases, being single-layer graphene (also illustrated as 112 in FIG. 1(B)). An NGP is composed of a graphene sheet or a plurality of graphene sheets with each sheet being a two-dimensional, hexagonal structure of carbon atoms. A mass of multiple NGPs (including discrete sheets/platelets of single-layer and/or few-layer graphene or graphene oxide may be made into a graphene film/paper (114 in FIG. 1(B)) using a film- or paper-making process.

Alternatively, with a low-intensity shearing, graphite worms tend to be separated into the so-called expanded graphite flakes (108 in FIG. 1(B) having a thickness>100 nm. These flakes can be formed into graphite paper or mat 106 using a paper- or mat-making process, with or without a resin binder. In one preferred embodiment of the present invention, the porous web can be made by using a slurry molding or a flake/binder spraying technique. These methods can be carried out in the following ways:

As a wet process, aqueous slurry is prepared which comprises a mixture of graphene sheets or expanded graphite flakes and, optionally, about 0.1 wt. % to about 10 wt. % resin powder binder (e.g., phenolic resin). The slurry is then directed to impinge upon a sieve or screen, allowing water to permeate through, leaving behind sheets/flakes and the binder. As a dry process, the directed sheet/flake spray-up process utilizes an air-assisted flake/binder spraying gun, which conveys flakes/sheets and an optional binder to a molding tool (e.g., a perforated metal screen shaped identical or similar to the part to be molded). Air goes through perforations, but the solid components stay on the molding tool surface.

Each of these routes can be implemented as a continuous process. For instance, the process begins with pulling a substrate (porous sheet) from a roller. The moving substrate receives a stream of slurry (as described in the above-described slurry molding route) from above the substrate. Water sieves through the porous substrate with all other ingredients (a mixture of graphene sheets or graphite flakes, optional conductive fillers, and an optional binder) remaining on the surface of the substrate being moved forward to go through a compaction stage by a pair of compaction rollers. Heat may be supplied to the mixture before, during, and after compaction to help cure the thermoset binder for retaining the shape of the resulting web or mat. The web or mat, with all ingredients held in place by the thermoset binder, may be stored first (e.g., wrapped around a roller). Similar procedures may be followed for the case where the mixture is delivered to the surface of a moving substrate by compressed air, like in a directed fiber/binder spraying process. Air will permeate through the porous substrate with other solid ingredients trapped on the surface of the substrate, which are conveyed forward. The subsequent operations are similar than those involved in the slurry molding route.

D. Deposition of Selenium on Massive Graphene Surfaces of the Porous Graphitic Structure Once a layer of porous graphitic structure is prepared, this layer can be immersed in an electrolyte (preferably liquid electrolyte), which comprises a solvent and a selenium source dissolved or dispersed in the solvent. This layer basically serves as a cathode in an external electrochemical deposition chamber or a cathode in an intended Li—Se cell (encased inside the packaging or casing of a battery).

Subsequently, an anode layer is also immersed in the chamber, or encased inside a battery cell. Any conductive material can be used as an anode material, but preferably this layer contains some lithium. In such an arrangement, the integral layer of porous graphitic structure and the anode are in ionic contact with the electrolyte. An electric current is then supplied between the anode and the integral layer of porous graphitic structure (serving as a cathode) with a sufficient current density for a sufficient period of time to electrochemically deposit nanoscaled selenium particles or coating on the graphene surfaces to form the pre-selenized active cathode layer. The required current density depends upon the desired speed of deposition and uniformity of the deposited material.

This current density can be readily adjusted to deposit Se particles or coating that have a thickness or diameter smaller than 20 nm (preferably <10 nm, more preferably <5 nm, and further preferably <3 nm). The resulting nanoscaled selenium particles or coating occupy a weight fraction of at least 70% (preferably >80%, more preferably >90%, and most preferably >95%) based on the total weights of the selenium particles or coating and the graphene material combined.

In one preferred embodiment, the selenium source is selected from $M_xSe_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof. In a desired embodiment, the metal element M is selected from Li, Na, K, Mg, Zn, Cu, Ti, Ni, Co, Fe, or Al. In a particularly desired embodiment, $M_xSe_y$ is selected from $Li_2Se_6$, $Li_2Se_7$, $Li_2Se_8$, $Li_2Se_9$, $Li_2Se_{10}$, $Na_2Se_6$, $Na_2Se_7$, $Na_2Se_8$, $Na_2Se_9$, $Na_2Se_{10}$, $K_2Se_6$, $K_2Se_7$, $K_2Se_8$, $K_2Se_9$, or $K_2Se_{10}$.

In one embodiment, the anode comprises an anode active material selected from an alkali metal, an alkaline metal, a transition metal, a metal from groups 13 to 17 of the periodic table, or a combination thereof. This anode can be the same anode intended for inclusion in a Li—Se cell.

The solvent may be selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof.

For the purpose of internal electrochemical deposition of Se on massive graphene surfaces of a cathode layer in a cell, the electrolyte may further comprise a metal salt selected from lithium perchlorate (LiClO$_4$), lithium hexafluorophosphate (LiPF$_6$), lithium borofluoride (LiBF$_4$), lithium hexafluoroarsenide (LiAsF$_6$), lithium trifluoro-metasulfonate (LiCF$_3$SO$_3$), bis-trifluoromethyl sulfonylimide lithium (LiN(CF$_3$SO$_2$)$_2$), lithium bis(oxalato)borate (LiBOB), lithium oxalyldifluoroborate (LiBF$_2$C$_2$O$_4$), lithium oxalyldifluoroborate (LiBF$_2$C$_2$O$_4$), lithium nitrate (LiNO$_3$), Li-Fluoroalkyl-Phosphates (LiPF$_3$(CF$_2$CF$_3$)$_3$), lithium bisperfluoro-ethysulfonylimide (LiBETI), lithium bis(trifluoromethanesulphonyl)imide, lithium bis(fluorosulphonyl) imide, lithium trifluoromethanesulfonimide (LiTFSI), an ionic liquid-based lithium salt, sodium perchlorate (NaClO$_4$), potassium perchlorate (KClO$_4$), sodium hexafluorophosphate (NaPF$_6$), potassium hexafluorophosphate (KPF$_6$), sodium borofluoride (NaBF$_4$), potassium borofluoride (KBF$_4$), sodium hexafluoroarsenide, potassium hexafluoroarsenide, sodium trifluoro-metasulfonate (NaCF$_3$SO$_3$), potassium trifluoro-metasulfonate (KCF$_3$SO$_3$), bis-trifluoromethyl sulfonylimide sodium (NaN(CF$_3$SO$_2$)$_2$), sodium trifluoromethanesulfonimide (NaTFSI), and bis-trifluoromethyl sulfonylimide potassium (KN(CF$_3$SO$_2$)$_2$), or a combination thereof.

In one preferred embodiment, as previously stated above, the electrochemical deposition is conducted before the cathode active layer is incorporated into a lithium-selenium (Li—Se) battery cell. In other words, the anode, the electrolyte, and the integral layer of porous graphitic structure (serving as a cathode layer) are positioned in an external container outside of a lithium-selenium cell. The needed apparatus is similar to an electro-plating system. The step of electrochemically depositing nanoscaled selenium particles or coating on the graphene surfaces is conducted outside the lithium-selenium cell and prior to the battery cell fabrication. After this selenium deposition is completed, the pre-selenized integral layer of porous graphitic structure is then incorporated into the lithium-selenium cell.

In another embodiment, the anode, the electrolyte, and the integral layer of porous graphitic structure are disposed inside a lithium-selenium cell. In other words, the battery cell itself is an electrochemical deposition system for pre-selenization of the cathode and the step of electrochemically depositing nanoscaled selenium particles or coating on the graphene surfaces occurs after the lithium-selenium cell is fabricated. This electrochemical deposition procedure is conducted during the first charge cycle of the Li—Se cell.

After an extensive and in-depth research effort, we have come to realize that such a pre-selenization surprisingly solves several most critical issues associated with current Li—Se cells. For instance, this method enables the selenium to be deposited in a thin coating or ultra-fine particle form, thus, providing ultra-short lithium ion diffusion paths and, hence, ultra-fast reaction times for fast battery charges and discharges. This is achieved while maintaining a relatively high proportion of selenium (the active material responsible for storing lithium) and, thus, high specific lithium storage capacity of the resulting cathode active layer in terms of high specific capacity (mAh/g, based on the total weight of the cathode layer, including the masses of the active material, Se, supporting graphene sheets, binder resin, and conductive filler).

It is of significance to note that one might be able to use a prior art procedure to deposit small Se particles, but not a high Se proportion, or to achieve a high proportion but only in large particles or thick film form. But, the prior art procedures have not been able to achieve both small Se particles and high Se proportion at the same time. This is why it is such an unexpected and highly advantageous thing to obtain a high selenium loading and yet, concurrently, maintaining an ultra-thin/small thickness/diameter of selenium. This has not been possible with any prior art selenium loading techniques. For instance, we have been able to deposit nanoscaled selenium particles or coating that occupy a >90% weight fraction of the cathode layer and yet maintaining a coating thickness or particle diameter<3 nm. This is quite a feat in the art of lithium-selenium batteries. As another example, we have achieved a >95% Se loading at an average Se coating thickness of 4.5-7.1 nm.

Electrochemists or materials scientists in the art of Li—Se batteries would expect that a greater amount of highly conducting graphene sheets or graphite flakes (hence, a smaller amount of Se) in the cathode active layer should lead to a better utilization of Se, particularly under high charge/discharge rate conditions. Contrary to these expectations, we have observed that the key to achieving a high Se utilization efficiency is minimizing the Se coating thickness or Se particle size and is independent of the amount of Se loaded into the cathode provided the Se coating or particle thickness/diameter is small enough (e.g. <10 nm, or even better if <5 nm). The problem here is that it has not been possible to maintain a thin Se coating or small particle size if Se is higher than 50% by weight. Here we have further surprisingly observed that the key to enabling a high specific capacity at the cathode under high rate conditions is to maintain a high Se loading and still keep the Se coating or particle size as small as possible, and this is accomplished by using the presently invented pre-selenization (selenium pre-loading) method.

The electrons coming from or going out through the external load or circuit must go through the conductive additives (in a conventional selenium cathode) or a conductive framework (e.g. exfoliated graphite mesoporous structure or nanostructure of conductive graphene sheets as herein disclosed) to reach the cathode active material. Since the cathode active material (e.g. selenium or lithium poly selenide) is a poor electronic conductor, the active material particle or coating must be as thin as possible to reduce the required electron travel distance.

Furthermore, the cathode in a conventional Li—Se cell typically has less than 70% by weight of selenium in a composite cathode composed of selenium and the conductive additive/support. Even when the selenium content in the prior art composite cathode reaches or exceeds 70% by weight, the specific capacity of the composite cathode is typically significantly lower than what is expected based on theoretical predictions. For instance, the theoretical specific capacity of selenium is 675 mAh/g. A composite cathode composed of 70% selenium (Se) and 30% carbon black (CB), without any binder, should be capable of storing up to 675×70%=472.5 mAh/g. Unfortunately, the observed specific capacity is typically less than 75% or 354 mAh/g (often less than 50% or 237 mAh/g in this example) of what could be achieved. In other words, the active material utilization rate is typically less than 75% (or even <50%). This has been a major issue in the art of Li—Se cells and there has been no solution to this problem. Most surprisingly, the implementation of massive graphene surfaces associated with a porous graphitic structure as a conductive supporting material for selenium or lithium poly selenide has made it possible to achieve an active material utilization rate of typically >>80%, more often greater than 90%, and, in many cases, close to 95%-99%.

Still another unexpected result of the instant method is the observation that thinner Se coating leads to more stable charge/discharge cycling with significantly reduced shuttling effect that has been a long-standing impediment to full commercialization of Li—Se batteries. We overcome this problem yet, at the same time, achieving a high specific capacity. In just about all the prior art Li—Se cells, a higher Se loading leads to a faster capacity decay.

The shuttling effect is related to the tendency for selenium or lithium poly selenide that forms at the cathode to get dissolved in the solvent and for the dissolved lithium poly selenide species to migrate from the cathode to the anode, where they irreversibly react with lithium to form species that prevent selenide from returning back to the cathode during the subsequent discharge operation of the Li—Se cell (the detrimental shuttling effect). It seems that the presence of massive graphene surfaces have been able to prevent or reduce such a dissolution and migration issue.

The electrolytic salts to be incorporated into a non-aqueous electrolyte may be selected from a lithium salt such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium [$LiN(CF_3SO_2)_2$], lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-fluoroalkyl-phosphates ($LiPF_3(CF_2CF_3)_3$), lithium bisperfluoroethysulfonylimide (LiBETI), an ionic liquid salt. Among them, $LiPF_6$, $LiBF_4$ and $LiN(CF_3SO_2)_2$ are preferred. The content of aforementioned electrolytic salts in the non-aqueous solvent is preferably 0.5 to 3.0 M (mol/L) at the cathode side and 3.0 to >10 M at the anode side.

The ionic liquid is composed of ions only. Ionic liquids are low melting temperature salts that are in a molten or liquid state when above a desired temperature. For instance, a salt is considered as an ionic liquid if its melting point is below 100° C. If the melting temperature is equal to or lower than room temperature (25° C.), the salt is referred to as a room temperature ionic liquid (RTIL). The IL salts are characterized by weak interactions, due to the combination of a large cation and a charge-delocalized anion. This results in a low tendency to crystallize due to flexibility (anion) and asymmetry (cation).

A typical and well-known ionic liquid is formed by the combination of a 1-ethyl-3-methylimidazolium (EMI) cation and an N,N-bis(trifluoromethane)sulphonamide (TFSI) anion. This combination gives a fluid with an ionic conductivity comparable to many organic electrolyte solutions and a low decomposition propensity and low vapor pressure up to ~300-400° C. This implies a generally low volatility and non-flammability and, hence, a much safer electrolyte for batteries.

Ionic liquids are basically composed of organic ions that come in an essentially unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide, and hexafluorophosphate as anions. Based on their compositions, ionic liquids come in different classes that basically include aprotic, protic and zwitterionic types, each one suitable for a specific application.

Common cations of room temperature ionic liquids (RTILs) include, but not limited to, tetraalkylammonium, di-, tri-, and tetra-alkylimidazolium, alkylpyridinium, dialkyl-pyrrolidinium, dialkylpiperidinium, tetraalkylphosphonium, and trialkylsulfonium. Common anions of RTILs include, but not limited to, $BF_4^-$, $B(CN)_4^-$, $CH_3BF_3^-$, $CH2CHBF_3^-$, $CF_3BF_3^-$, $C_2F_5BF_3^-$, $n\text{-}C_3F_7BF_3^-$, $n\text{-}C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte ingredient (a salt and/or a solvent) in a Li—Se cell.

In one embodiment, the cathode layer may be pre-loaded with up to 30% (preferably <15% and more preferably <10%) of an active material (selenium or lithium poly selenide) prior to the cathode layer fabrication. In yet another embodiment, the cathode layer can contain a conductive filler, such as carbon black (CB), acetylene black (AB), graphite particles, activated carbon, mesoporous carbon, mesocarbon microbead (MCMB), carbon nanotube (CNT), carbon nanofiber (CNF), carbon fiber, or a combination thereof.

The anode active material may contain, as an example, lithium metal foil or a high-capacity Si, Sn, or $SnO_2$ capable of storing a great amount of lithium. The cathode active material may contain pure selenium (if the anode active material contains lithium), lithium poly selenide, or any selenium-containing compound, molecule, or polymer. If the cathode active material includes lithium-containing species (e.g. lithium poly selenide) when the cell is made, the anode active material can be any material capable of storing a large amount of lithium (e.g. Si, Ge, Sn, $SnO_2$, etc.).

At the anode side, when lithium metal is used as the sole anode active material in a Li—Se cell, there is concern about the formation of lithium dendrites, which could lead to internal shorting and thermal runaway. Herein, we have used two approaches, separately or in combination, to address this dendrite formation issue: one involving the use of a high-concentration electrolyte at the anode side and the other the use of a nanostructure composed of conductive nanofilaments. For the latter, multiple conductive nanofilaments are processed to form an integrated aggregate structure, preferably in the form of a closely packed web, mat, or paper, characterized in that these filaments are intersected, overlapped, or somehow bonded (e.g., using a binder material) to one another to form a network of electron-conducting pathways. The integrated structure has substantially interconnected pores to accommodate electrolyte. The nanofilament may be selected from, as examples, a carbon nanofiber (CNF), graphite nanofiber (GNF), carbon nanotube (CNT), metal nanowire (MNW), conductive nanofibers obtained by electro-spinning, conductive electrospun composite nanofibers, nanoscaled graphene platelet (NGP), or a combination thereof. The nanofilaments may be bonded by a binder material selected from a polymer, coal tar pitch, petroleum pitch, mesophase pitch, coke, or a derivative thereof.

Nanofibers may be selected from the group consisting of an electrically conductive electrospun polymer fiber, electrospun polymer nanocomposite fiber comprising a conductive filler, nanocarbon fiber obtained from carbonization of an electrospun polymer fiber, electrospun pitch fiber, and combinations thereof. For instance, a nanostructured electrode can be obtained by electro-spinning of polyacrylonitrile (PAN) into polymer nanofibers, followed by carbonization of PAN. It may be noted that some of the pores in the structure, as carbonized, are greater than 100 nm and some smaller than 100 nm.

The presently invented cathode active layer may be incorporated in one of at least four broad classes of rechargeable lithium metal cells (or, similarly, for sodium metal or potassium metal cells):

(A) Lithium metal-selenium with a conventional anode configuration: The cell contains an optional cathode current collector, a presently invented cathode layer, a separator/electrolyte, and an anode current collector. Potential dendrite formation may be overcome by using the high-concentration electrolyte at the anode.

(B) Lithium metal-selenium cell with a nanostructured anode configuration: The cell contains an optional cathode current collector, a cathode herein invented, a separator/electrolyte, an optional anode current collector, and a nanostructure to accommodate lithium metal that is deposited back to the anode during a charge or re-charge operation. This nanostructure (web, mat, or paper) of nanofilaments provide a uniform electric field enabling uniform Li metal deposition, reducing the propensity to form dendrites. This configuration can provide a dendrite-free cell for a long and safe cycling behavior.

(C) Lithium ion-selenium cell with a conventional anode: For instance, the cell contains an anode composed of anode active graphite particles bonded by a binder, such as polyvinylidene fluoride (PVDF) or styrene-butadiene rubber (SBR). The cell also contains a cathode current collector, a cathode of the instant invention, a separator/electrolyte, and an anode current collector; and (D) Lithium ion-selenium cell with a nanostructured anode: For instance, the cell contains a web of nanofibers coated with Si coating or bonded with Si nanoparticles. The cell also contains an optional cathode current collector, a cathode herein invented, a separator/electrolyte, and an anode current collector. This configuration provides an ultra-high capacity, high energy density, and a safe and long cycle life.

In the lithium-ion selenium cell (e.g. as described in (C) and (D) above), the anode active material can be selected from a wide range of high-capacity materials, including (a) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd), and lithiated versions thereof; (b) alloys or intermetallic compounds of Si, Ge, Sn, Pb, Sb, Bi, Zn, Al, or Cd with other elements, and lithiated versions thereof, wherein said alloys or compounds are stoichiometric or non-stoichiometric; (c) oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites, and lithiated versions thereof; (d) salts and hydroxides of Sn and lithiated versions thereof; (e) carbon or graphite materials and prelithiated versions thereof; and combinations thereof. Non-lithiated versions may be used if the cathode side contains lithium polysulfides or other lithium sources when the cell is made.

A possible lithium metal cell may be comprised of an anode current collector, an electrolyte phase (optionally but preferably supported by a porous separator, such as a porous polyethylene-polypropylene co-polymer film), a cathode of the instant invention, and an optional cathode collector. This cathode current collector is optional because the presently invented layer of porous graphene or graphitic structure, if properly designed, can act as a current collector or as an extension of a current collector.

For a sodium ion-selenium cell or potassium ion-selenium cell, the anode active material layer can contain an anode active material selected from the group consisting of: (a) Sodium- or potassium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof; (b) Sodium- or potassium-containing alloys or intermetallic compounds of Si, Ge, Sn, Pb, Sb, Bi, Zn, Al, Ti, Co, Ni, Mn, Cd, and their mixtures; (c) sodium- or potassium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof, (d) Sodium or potassium salts; (e) particles of graphite, hard carbon, soft carbon or carbon particles and pre-sodiated versions thereof (pre-doped or pre-loaded with Na), and combinations thereof.

The following examples are presented primarily for the purpose of illustrating the best mode practice of the present invention and should not be construed as limiting the scope of the present invention.

Example 1: Preparation of Graphene Oxide (GO) and Reduced GO Nanosheets from Natural Graphite Powder and their Paper/Mats (Layers of Porous Graphitic Structure)

Natural graphite from Huadong Graphite Co. (Qingdao, China) was used as the starting material. GO was obtained by following the well-known modified Hummers method, which involved two oxidation stages. In a typical procedure, the first oxidation was achieved in the following conditions: 1100 mg of graphite was placed in a 1000 mL boiling flask. Then, 20 g of $K_2S_2O_8$, 20 g of $P_2O_5$, and 400 mL of a concentrated aqueous solution of $H_2SO_4$ (96%) were added in the flask. The mixture was heated under reflux for 6 hours and then let without disturbing for 20 hours at room temperature. Oxidized graphite was filtered and rinsed with abundant distilled water until neutral pH. A wet cake-like material was recovered at the end of this first oxidation.

For the second oxidation process, the previously collected wet cake was placed in a boiling flask that contains 69 mL of a concentrated aqueous solution of $H_2SO_4$ (96%). The flask was kept in an ice bath as 9 g of $KMnO_4$ was slowly added. Care was taken to avoid overheating. The resulting mixture was stirred at 35° C. for 2 hours (the sample color turning dark green), followed by the addition of 140 mL of water. After 15 min, the reaction was halted by adding 420 mL of water and 15 mL of an aqueous solution of 30 wt % $H_2O_2$. The color of the sample at this stage turned bright yellow. To remove the metallic ions, the mixture was filtered and rinsed with a 1:10 HCl aqueous solution. The collected material was gently centrifuged at 2700 g and rinsed with deionized water. The final product was a wet cake that contained 1.4 wt % of GO, as estimated from dry extracts. Subsequently, liquid dispersions of GO platelets were obtained by lightly sonicating wet-cake materials, which were diluted in deionized water.

Surfactant-stabilized RGO (RGO-BS) was obtained by diluting the wet-cake in an aqueous solution of surfactants instead of pure water. A commercially available mixture of cholate sodium (50 wt %) and deoxycholate sodium (50 wt %) salts provided by Sigma Aldrich was used. The surfactant weight fraction was 0.5 wt %. This fraction was kept constant for all samples. Sonication was performed using a Branson Sonifier S-250A equipped with a 13 mm step disruptor horn and a 3 mm tapered micro-tip, operating at a 20 kHz frequency. For instance, 10 mL of aqueous solutions containing 0.1 wt % of GO was sonicated for 10 min and subsequently centrifuged at 2700 g for 30 min to remove any non-dissolved large particles, aggregates, and impurities. Chemical reduction of as-obtained GO to yield RGO was conducted by following the method, which involved placing 10 mL of a 0.1 wt % GO aqueous solution in a boiling flask of 50 mL. Then, 10 μL of a 35 wt % aqueous solution of $N_2H_4$ (hydrazine) and 70 mL of a 28 wt % of an aqueous solution of $NH_4OH$ (ammonia) were added to the mixture, which was stabilized by surfactants. The solution was heated to 90° C. and refluxed for 1 h. The pH value measured after the reaction was approximately 9. The color of the sample turned dark black during the reduction reaction. These suspensions (GO in water and RGO in surfactant water) were then filtered through a vacuum-assisted membrane filtration apparatus to obtain GO and RGO paper or mat.

Example 2: Preparation of Discrete Functionalized GO Sheets from Graphite Fibers and Porous Films of Chemically Functionalized GO Chopped graphite fibers with an average diameter of 12 μm and natural graphite particles were separately used as a starting material, which was immersed in a mixture of concentrated seleniumic acid, nitric acid, and potassium permanganate (as the chemical intercalate and oxidizer) to prepare graphite intercalation compounds (GICs). The starting material was first dried in a vacuum oven for 24 h at 80° C. Then, a mixture of concentrated seleniumic acid, fuming nitric acid, and potassium permanganate (at a weight ratio of 4:1:0.05) was slowly added, under appropriate cooling and stirring, to a three-neck flask containing fiber segments. After 5-16 hours of reaction, the acid-treated graphite fibers or natural graphite particles were filtered and washed thoroughly with deionized water until the pH level of the solution reached 6. After being dried at 100° C. overnight, the resulting graphite intercalation compound (GIC) or graphite oxide fiber was re-dispersed in water and/or alcohol to form a slurry.

In one sample, five grams of the graphite oxide fibers were mixed with 2,000 ml alcohol solution consisting of alcohol and distilled water with a ratio of 15:85 to obtain a slurry mass. Then, the mixture slurry was subjected to ultrasonic irradiation with a power of 200 W for various lengths of time. After 20 minutes of sonication, GO fibers were effectively exfoliated and separated into thin graphene oxide sheets with oxygen content of approximately 23%-31% by weight. Ammonia water was added to one pot of the resulting suspension, which was ultrasonicated for another hour to produce $NH_2$-functionalized graphene oxide (f-GO). The GO sheets and functionalized GO sheets were separately diluted to a weight fraction of 5% and the suspensions were allowed to stay in the container without any mechanical disturbance for 2 days, forming liquid crystalline phase in the water-alcohol liquid when alcohol is being vaporized at 80° C.

The resulting suspensions containing GO or f-GO liquid crystals were then cast onto a glass surface using a doctor's blade to exert shear stresses, inducing GO sheet orientations. The resulting GO or f-GO coating films, after removal of liquid, have a thickness that can be varied from approximately 10 to 500 μm. The resulting GO film was then subjected to heat treatments that involve an initial thermal reduction temperature of 80-350° C. for 8 hours, followed by heat-treating at a second temperature of 1,500-2,850° C. for different specimens to obtain various porous graphitic films.

Example 3: Preparation of Single-Layer Graphene Sheets and Porous Graphene Mats from Mesocarbon Micro-Beads (MCMBs)

Mesocarbon micro-beads (MCMBs) were supplied from China Steel Chemical Co., Kaohsiung, Taiwan. This material has a density of about 2.24 $g/cm^3$ with a median particle size of about 16 μm. In one example, MCMB (10 grams) were intercalated with an acid solution (seleniumic acid, nitric acid, and potassium permanganate at a ratio of 4:1:0.05) for 48-96 hours. Upon completion of the reaction, the mixture was poured into deionized water and filtered. The intercalated MCMBs were repeatedly washed in a 5% solution of HCl to remove most of the sulfate ions. The sample was then washed repeatedly with deionized water until the pH of the filtrate was no less than 4.5. The slurry was then subjected ultrasonication for 10-100 minutes to fully exfoliate and separate GO sheets. TEM and atomic force microscopic studies indicate that most of the GO sheets were single-layer graphene when the oxidation treatment exceeded 72 hours, and 2- or 3-layer graphene when the oxidation time was from 48 to 72 hours. The GO sheets contain oxygen proportion of approximately 35%-47% by weight for oxidation treatment times of 48-96 hours.

The suspension was then diluted to approximately 0.5% by weight in a container and was allowed to age therein without mechanical disturbance. The suspension was then slightly heated (to 65° C.) to vaporize the water under a vacuum-pumping condition. The formation of liquid crystalline phase became more apparent as water was removed and the GO concentration was increased. The final concentration in this sample was set at 4% by weight. The dispersion containing liquid crystals of GO sheets was then cast onto a glass surface using a doctor's blade to exert shear stresses, inducing GO sheet orientations. The resulting GO films, after removal of liquid, have a thickness that can be varied from approximately 10 to 500 μm. The resulting GO compact was then subjected to heat treatments that typically involve an initial thermal reduction temperature of 80-500° C. for 1-5 hours, followed by heat-treating at a second temperature of 1,500-2,850° C.

Example 4: Preparation of Pristine Graphene Sheets/Platelets (0% Oxygen) and the Effect of Pristine Graphene Sheets Recognizing the possibility of the high defect population in GO sheets acting to reduce the conductivity of individual graphene plane, we decided to study if the use of pristine graphene sheets (non-oxidized and oxygen-free) can lead to a HOGF having a higher thermal conductivity. Pristine graphene sheets were produced by using the direct ultrasonication or liquid-phase production process.

In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. The suspension was then filtered via vacuum-assisted filtration to obtain porous graphene paper structures.

Example 5: Preparation of Graphene Fluoride Nanosheets and Porous Graphitic Structure from these Sheets Several processes have been used by us to produce GF, but only one process is herein described as an example. In a typical procedure, highly exfoliated graphite (HEG) was prepared from intercalated compound $C_2F-xClF_3$. HEG was further fluorinated by vapors of chlorine trifluoride to yield fluorinated highly exfoliated graphite (FHEG). Pre-cooled Teflon reactor was filled with 20-30 mL of liquid pre-cooled $ClF_3$, the reactor was closed and cooled to liquid nitrogen temperature. Then, no more than 1 g of HEG was put in a container with holes for $ClF_3$ gas to access and situated inside the reactor. In 7-10 days a gray-beige product with approximate formula $C_2F$ was formed.

Subsequently, a small amount of FHEG (approximately 0.5 mg) was mixed with 20-30 mL of an organic solvent (methanol, ethanol, 1-propanol, 2-propanol, 1-butanol, tert-butanol, isoamyl alcohol) and subjected to an ultrasound treatment (280 W) for 30 min, leading to the formation of homogeneous yellowish dispersions. Five minutes of sonication was enough to obtain a relatively homogenous dispersion of few-layer graphene fluoride, but longer sonication times ensured the production of mostly single-layer graphene fluoride sheets. Some of these suspension samples were subjected to vacuum oven drying to recover separated graphene fluoride sheets. These graphene fluoride sheets were then added into a polymer-solvent or monomer-solvent solution to form a suspension. Various polymers or monomers (or oligomers) were utilized as the precursor film materials for subsequent carbonization and graphitization treatments.

Upon casting on a glass surface with the solvent removed, the dispersion became a brownish film formed on the glass surface. When these GF-reinforced polymer films were heat-treated, fluorine and other non-carbon elements were released as gases that generated pores in the film. The resulting porous graphitic films had physical densities from 0.03 to 1.22 g/cm$^3$. These porous graphitic films were then roll-pressed to obtain solid graphitic films (porous graphitic structures) having a density from 0.7 to 1.5 g/cm$^3$.

Example 6: Preparation of Nitrogenated Graphene Nanosheets and Porous Graphitic Structures Graphene oxide (GO), synthesized in Example 1, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene:urea mass ratios of 1:0.5, 1:1 and 1:2 are designated as NGO-1, NGO-2 and NGO-3 respectively and the nitrogen contents of these samples were 14.7, 18.2 and 17.5 wt % respectively as found by elemental analysis. These nitrogenated graphene sheets remain dispersible in water. Two types of dispersions were then prepared. One involved adding water-soluble polymer (e.g. polyethylene oxide) into the nitrogenated graphene sheet-water dispersion to produce a water-based suspension. The other involved drying the nitrogenated graphene sheet-water dispersion to recover nitrogenated graphene sheets, which were then added into precursor polymer-solvent solutions to obtain organic solvent-based suspensions.

The resulting suspensions were then cast, dried, carbonized and graphitized to produce porous graphitic structures. The carbonization temperatures for comparative samples are 900-1,350° C. The graphitization temperatures are from 2,200° C. to 2,950° C.

Example 7: Exfoliated Graphite Worms from Natural Graphite

Natural graphite, nominally sized at 45 μm, provided by Asbury Carbons (405 Old Main St., Asbury, N.J. 08802, USA) was milled to reduce the size to approximately 14 μm. The chemicals used in the present study, including fuming nitric acid (>90%), seleniumic acid (95-98%), potassium chlorate (98%), and hydrochloric acid (37%), were purchased from Sigma-Aldrich and used as received.

A reaction flask containing a magnetic stir bar was charged with seleniumic acid (360 mL) and nitric acid (180 mL) and cooled by immersion in an ice bath. The acid mixture was stirred and allowed to cool for 15 min, and graphite (20 g) was added under vigorous stirring to avoid agglomeration. After the graphite powder was well dispersed, potassium chlorate (110 g) was added slowly over 15 min to avoid sudden increases in temperature. The reaction flask was loosely capped to allow evolution of gas from the reaction mixture, which was stirred for 48 hours at room temperature. On completion of the reaction, the mixture was poured into 8 L of deionized water and filtered. The slurry was spray-dried to recover an expandable graphite sample. The dried, expandable graphite was quickly placed in a tube furnace preheated to 1,000° C. and allowed to stay inside a quartz tube for approximately 40 seconds to obtain exfoliated graphite worms. Some of the graphite forms were then roll-pressed to obtain samples of re-compressed exfoliated graphite having a range of physical densities (e.g. 0.3 to 1.2 g/cm$^3$). Some of the graphite worms were subjected to low-intensity sonication to produce expanded graphite flakes. These expanded graphite flakes were then made into a paper form using the vacuum-assisted filtration technique.

Example 8: Exfoliated Graphite Worms from Various Synthetic Graphite Particles or Fibers Additional exfoliated graphite worms were prepared according to the same procedure described in Example 1, but the starting graphite materials were graphite fiber (Amoco P-100 graphitized carbon fiber), graphitic carbon nanofiber (Pyrograph-III from Applied Science, Inc., Cedarville, Ohio), spheroidal graphite (HuaDong Graphite, QinDao, China), and mesocarbon micro-beads (MCMBs) (China Steel Chemical Co., Taiwan), respectively. These four types of laminar graphite materials were intercalated and exfoliated under similar conditions as used for Example 1 for different periods of time, from 24 hours to 96 hours.

Some amount of the graphite forms was then roll-pressed to obtain samples of re-compressed exfoliated graphite having a range of physical densities (e.g. 0.3 to 1.2 g/cm$^3$). A second amount of the graphite worms was subjected to low-intensity sonication to produce expanded graphite flakes. These expanded graphite flakes were then made into a paper form (the porous graphitic structure) using the vacuum-assisted filtration technique.

Example 9: Exfoliated Graphite Worms from Natural Graphite Using Hummers Method Additional graphite intercalation compound (GIC) was prepared by intercalation and oxidation of natural graphite flakes (original size of 200 mesh, from Huadong Graphite Co., Pingdu, China, milled to approximately 15 μm) with seleniumic acid, sodium nitrate, and potassium permanganate according to the method of Hummers [U.S. Pat. No. 2,798,878, Jul. 9, 1957]. In this example, for every 1 gram of graphite, we used a mixture of 22 ml of concentrated seleniumic acid, 2.8 grams of potassium permanganate, and 0.5 grams of sodium nitrate. The graphite flakes were immersed in the mixture solution and the reaction time was approximately three hours at 30° C. It is important to caution that potassium permanganate should be gradually added to seleniumic acid in a well-controlled manner to avoid overheat and other safety issues. Upon completion of the reaction, the mixture was poured into deionized water and filtered. The sample was then washed repeatedly with deionized water until the pH of the filtrate was approximately 5. The slurry was spray-dried and stored in a vacuum oven at 60° C. for 24 hours. The resulting GIC was exposed to a temperature of 1,050° C. for 35 seconds in a quartz tube filled with nitrogen gas to obtain worms of exfoliated graphite flakes.

Some of the graphite forms were then roll-pressed to obtain samples of re-compressed exfoliated graphite having a range of physical densities (e.g. 0.3 to 1.2 g/cm$^3$). Some of the graphite worms were subjected to low-intensity sonication to produce expanded graphite flakes. These expanded graphite flakes were then made into a paper form using the vacuum-assisted filtration technique.

Example 10: Conductive Web of Filaments from Electrospun PAA Fibrils as a Supporting Layer for the Anode Poly(amic acid) (PAA) precursors for spinning were prepared by copolymerizing of pyromellitic dianhydride (Aldrich) and 4,4'-oxydianiline (Aldrich) in a mixed solvent of tetrahydrofurane/methanol (THF/MeOH, 8/2 by weight). The PAA solution was spun into fiber web using an electrostatic spinning apparatus. The apparatus consisted of a 15 kV DC power supply equipped with the positively charged capillary from which the polymer solution was extruded, and a negatively charged drum for collecting the fibers. Solvent removal and imidization from PAA were performed concurrently by stepwise heat treatments under air flow at 40° C. for 12 h, 100° C. for 1 h, 250° C. for 2 h, and 350° C. for 1 h. The thermally cured polyimide (PI) web samples were carbonized at 1,000° C. to obtain carbonized nanofibers with an average fibril diameter of 67 nm. Such a web can be used as a conductive substrate for an anode active material. We observe that the implementation of a network of conductive nanofilaments at the anode of a Li—Se cell can effectively suppress the initiation and growth of lithium dendrites that otherwise could lead to internal shorting.

Example 11: Electrochemical Deposition of Se on Various Webs or Paper Structures (External Electrochemical Deposition) for Li—Se, Na—Se, and K—Se Batteries The electrochemical deposition may be conducted before the cathode active layer is incorporated into an alkali metal-selenium battery cell (Li—Se, Na—Se, or K—Se cell). In this approach, the anode, the electrolyte, and the integral layer of porous graphitic structure (serving as a cathode layer) are positioned in an external container outside of a lithium-selenium cell. The needed apparatus is similar to an electro-plating system, which is well-known in the art.

In a typical procedure, a metal polyselenide ($M_xSe_y$) is dissolved in a solvent (e.g. mixture of DOL/DME in a volume ratio from 1:3 to 3:1) to form an electrolyte solution. An amount of a lithium salt may be optionally added, but this is not required for external electrochemical deposition. A wide variety of solvents can be utilized for this purpose and there is no theoretical limit to what type of solvents can be used; any solvent can be used provided that there is some solubility of the metal polyselenide in this desired solvent. A greater solubility would mean a larger amount of selenium can be derived from the electrolyte solution.

The electrolyte solution is then poured into a chamber or reactor under a dry and controlled atmosphere condition (e.g. He or Nitrogen gas). A metal foil can be used as the anode and a layer of the porous graphitic structure as the cathode; both being immersed in the electrolyte solution. This configuration constitutes an electrochemical deposition system. The step of electrochemically depositing nanoscaled selenium particles or coating on the graphene surfaces is conducted at a current density preferably in the range from 1 mA/g to 10 A/g, based on the layer weight of the porous graphitic structure.

The chemical reactions that occur in this reactor may be represented by the following equation: $M_xSe_y \rightarrow M_xSe_{y-z} + zSe$ (typically z=1-4). Quite surprisingly, the precipitated Se is preferentially nucleated and grown on massive graphene surfaces to form nanoscaled coating or nanoparticles. The coating thickness or particle diameter and the amount of Se coating/particles may be controlled by the specific surface area, electro-chemical reaction current density, temperature and time. In general, a lower current density and lower reaction temperature lead to a more uniform distribution of Se and the reactions are easier to control. A longer reaction time leads to a larger amount of Se deposited on graphene surfaces and the reaction is ceased when the selenium source is consumed or when a desired amount of Se is deposited.

Example 12: Electrochemical Deposition of Se on Various Webs or Paper-Based Cathode Structures in Li—Se, Na—Se, or K—Se Batteries (Internal Electrochemical Deposition)

As an alternative to the external electrochemical deposition, an internal electrochemical conversion and deposition of Se from an electrolyte-borne selenium source onto massive graphene surfaces was also conducted using a broad array of porous graphitic structures. As a typical procedure, the anode, the electrolyte, and the integral layer of porous graphitic structure are packaged inside a housing to form a lithium-selenium cell. In such a configuration, the battery cell itself is an electrochemical deposition system for pre-selenization of the cathode and the step of electrochemically depositing nanoscaled selenium particles or coating on the graphene surfaces occurs after the lithium-selenium cell is fabricated and conducted during the first charge cycle of the Li—Se cell.

As a series of examples, lithium polyselenide ($Li_xSe_y$)— and sodium polyselenide ($Na_xSe_y$)-containing electrolytes with desired x and y values (e.g. x=2, and y=6-10) dissolved in solvent were prepared by chemically reacting stoichiometric amounts of selenium and $Li_2Se$ or $Na_2Se$ in polyselenide free electrolyte of 0.5 M LiTFSI+0.2 M LiNO$_3$ (or 0.5 M NaTFSI+0.2 M NaNO$_3$) in DOL/DME (1:1, v:v). The electrolyte was stirred at 75° C. for 3-7 hours and then at room temperature for 48 hours. The resulting electrolytes contain different Li$_x$Se$_y$ or Na$_x$Se$_y$ species (e.g. x=2, and y=6-10, depending upon reaction times and temperatures), which are intended for use as a selenium source in a battery cell.

In a Li—Se or Na—Se cell, one of these electrolytes was selected to combine with an anode current collector (Cu foil), an anode layer (e.g. Li metal foil or Na particles), a porous separator, a layer of porous graphitic structure, and a cathode current collector (Al foil) to form a Li—Se or room temperature Na—Se cell. The cell was then subjected to a first charge procedure using a current density ranging from 5 mA/g to 50 A/g. The best current density range was found to be from 50 mA/g to 5 A/g.

Examples of the metal polysulfide (M$_x$Se$_y$) materials, solvents, graphene materials, and exfoliated graphite materials used in the present study are presented in Table 1 below:

Comparative Examples 12a: Mixing of Selenium with Graphene Sheets or Activated Carbon Particles Via Ball-Milling Selenium particles and graphene sheets (0% to 49% by weight of Se in the resulting composite) were physically blended and then subjected to ball milling for 2-24 hours to obtain Se-graphene composite particles (typically in a ball or potato shape). For comparison, graphene sheets only (without Se) were also ball-milled to obtain ball- or potato-shaped graphene particles. The particles, containing various Se contents, were then made into a layer of graphene structure intended for use in the cathode. Another series of samples for comparison were made under similar processing conditions, but with activated carbon particles replacing graphene sheets.

TABLE 1

Selected examples of the metal polysulfide materials, solvents, graphene materials, and exfoliated graphite materials used in the present study.

| Selenium source (e.g. M$_x$Se$_y$) | Solvent | Li/Na/K salts | Type of porous graphitic structure in the cathode |
|---|---|---|---|
| Li$_2$Se$_6$ | DOL/DME | LiTFSI | Pristine graphene, GO, GRO, graphene fluoride |
| Li$_2$Se$_9$ | DOL/DME | LiTFSI | Nitrogenated graphene, graphite worms, expanded graphite |
| Na$_2$Se$_5$ | Tetra ethylene glycol dimethyl ether (TEGDME) | NaTFSI | Pristine graphene, GO, GRO, graphene fluoride, NH$_2$-functionalized graphene |
| Na$_2$Se$_6$ | TEGDME | NaTFSI | RGO, graphite worms, expanded graphite |
| K$_2$Se$_6$ | TEGDME | KTFSI | RGO, graphite worms, expanded graphite |
| MgSe$_6$ | Diglyme/tetraglyme | [Mg$_2$Cl$_3$][HMDSAlCl$_3$] (HMDS = hexamethyldisilazide) | Pristine graphene, GRO, graphite worms, expanded graphite |
| MgSe$_4$ | Diglyme/tetraglyme | [Mg$_2$Cl$_3$][HMDSAlCl$_3$] (HMDS = hexamethyldisilazide) | Pristine graphene, GRO, graphite worms, expanded graphite |
| CuSe$_2$ | NH$_4$OH or HCl or H$_2$SO$_4$ | CuCl$_2$ | Pristine graphene, GRO, graphite worms, expanded graphite |
| Cu$_8$Se$_5$ | NH$_4$OH or HCl or H$_2$SO$_4$ | CuCl$_2$ | Pristine graphene, GRO, graphite worms, expanded graphite |
| ZnSe | H$_2$SO$_4$ solution | ZnSO$_4$ | Pristine graphene, GRO, graphite worms, expanded graphite |
| Al$_2$Se$_3$ | H$_2$SO$_4$ | Al$_2$(SO$_4$)$_3$ | RGO, graphite worms |
| SnSe$_2$ | HNO$_3$ and HCl | SnCl$_2$ | Pristine graphene, expanded graphite |
| SnSe | HCl | SnCl$_2$ | Pristine graphene, GRO, graphite worms, expanded graphite |

Several series of Li metal, Na metal, Na-ion, and Li-ion cells were prepared using the presently prepared cathode. The first series is a Li or Na metal cell containing a copper foil as an anode current collector and the second series is also a Li or Na metal cell having a nanostructured anode of conductive filaments (based on electrospun carbon fibers) plus a copper foil current collector. The third series is a Li-ion cell having a nanostructured anode of conductive filaments (based on electrospun carbon fibers coated with a thin layer of Si using CVD) plus a copper foil current collector. The fourth series is a Li-ion cell having a graphite-based anode active material as an example of the more conventional anode.

Examples 13: Some Examples of Electrolytes Used

A wide range of lithium salts can be dissolved in a wide array of solvents, individually or in a mixture form. Both ether- and carbonate-based solvents are suitable for use in an electrolyte for a Li—Se cell. The following are good choices for lithium salts that are dissolved well to a high concentration in selected solvents: lithium borofluoride (LiBF$_4$), lithium trifluoro-metasulfonate (LiCF$_3$SO$_3$), lithium bis-trifluoromethyl sulfonylimide (LiN(CF$_3$SO$_2$)$_2$ or LITFSI), lithium bis(oxalato)borate (LiBOB), lithium oxalyldifluoroborate (LiBF$_2$C$_2$O$_4$), and lithium bisperfluoroethy-sulfonylimide (LiBETI). These selected solvents are DME/DOL mixture, TEGDME/DOL, PEGDME/DOL, and TEGDME. A good electrolyte additive for helping to stabilize Li metal is $LiNO_3$. Useful sodium salts and potassium salts include sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), and bis-trifluoromethyl sulfonylimide potassium ($KN(CF_3SO_2)_2$). Good solvents are DME/DOL mixture, TEGDME/DOL, PEGDME/DOL, and TEGDME.

Room temperature ionic liquids (RTILs) are of great interest due to their low volatility and non-flammability. Particularly useful ionic liquid-based electrolyte systems include: lithium bis(trifluoro methanesulfonyl)imide in a N-n-butyl-N-ethylpyrrolidinium bis(trifluoromethane sulfonyl)imide (LiTFSI in BEPyTFSI), N-methyl-N-propylpiperidinium bis(trifluoromethyl sulfonyl)imide ($PP_{13}TFSI$) containing LiTFSI, N,N-diethyl-N-methyl-N-(2-methoxyethyl) ammonium bis(trifluoromethylsulfonyl)imide (DEMETFSI) containing LiTFSI.

Examples 14: Evaluation of Electrochemical Performance of Various Li—Se, Na—Se, and K—Se Cells Charge storage capacities were measured periodically and recorded as a function of the number of cycles. The specific discharge capacity herein referred to is the total charge inserted into the cathode during the discharge, per unit mass of the composite cathode (counting the weights of cathode active material, conductive additive or support, binder, and any optional additive combined). The specific charge capacity refers to the amount of charges per unit mass of the composite cathode. The specific energy and specific power values presented in this section are based on the total cell weight. The morphological or micro-structural changes of selected samples after a desired number of repeated charging and recharging cycles were observed using both transmission electron microscopy (TEM) and scanning electron microscopy (SEM).

Figure 3:
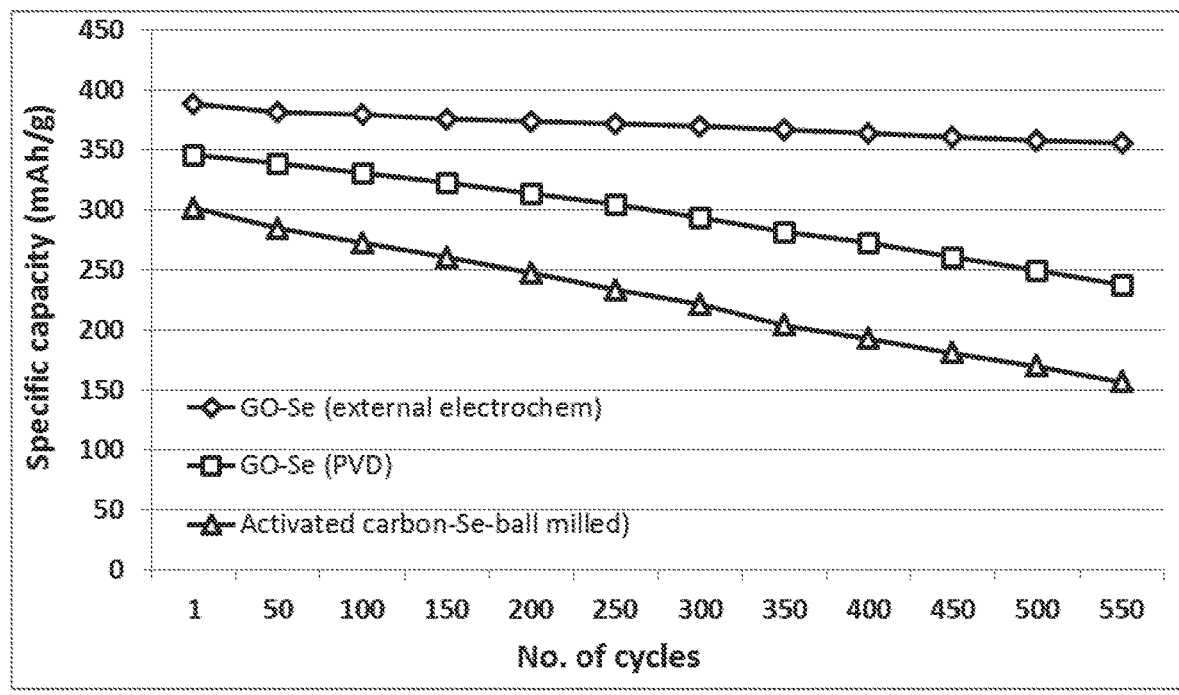
FIG. 3 The charge and discharge cycling results of three Li—Se cells, one containing a presently invented cathode structure prepared by the external electrochemical deposition of selenium into a layer of porous recompressed exfoliated graphite paper, the second cell containing a cathode prepared by using PVD to deposit selenium in a comparable sheet of recompressed exfoliated graphite paper, and the third containing a cathode material prepared by ball-milling a mixture of Se powder and activated carbon powder.

Shown in FIG. 3 are charge and discharge cycling results of three Li—Se cells, one containing a presently invented cathode structure prepared by the external electrochemical deposition of selenium into a layer of porous recompressed exfoliated graphite paper, the second cell containing a cathode prepared by using PVD to deposit selenium in a comparable sheet of recompressed exfoliated graphite paper, and the third containing a cathode material prepared by ball-milling a mixture of Se powder and activated carbon powder. The discharge capacities of the above two cells are plotted as a function of the number of charge-discharge cycles. The cathode layers in the two Li—Se cells were designed to have approximately 65% by weight of Se deposited therein. Presumably, the resulting composite or hybrid cathode of each cell should exhibit a maximum specific capacity of 675×65%=439 mAh/g. However, the cathode layer prepared by PVD deposition of Se exhibits a specific capacity of only 345 mAh/g, which means a Se utilization efficiency of 345/439=78.6%. The cathode layer prepared by ball milling of AC-Se powder mixture exhibits a specific capacity of only 301 mAh/g, which means a Se utilization efficiency of 301/439=68%. In contrast, the cathode layer having electrochemically deposited Se coating (thickness 8.2 nm) prepared according to an embodiment of the instant invention delivers an Se utilization efficiency of 388/439=88%. This dramatic difference in efficiency is truly stunning. Data from many more samples investigated are summarized in Table 2 below:

TABLE 2

Selenium utilization efficiency data for alkali metal-selenium cell cathodes containing various Se contents, Se coating thicknesses or particle diameters, substrate materials, and Se deposition methods.

| Sample ID | Cathode active layer material | % of Se and thickness or diameter (nm) | Cathode discharge capacity (mAh/g) | Discharge capacity, mAh/g, based on Se weight | Se utilization efficiency |
|---|---|---|---|---|---|
| PG-1 | Pristine graphene | 95% Se; 6.1 nm | 585 | 615.8 | 91.23% |
| PG-2 | Pristine graphene | 95% Se; 3.5 nm | 604 | 635.8 | 94.19% |
| PG-3 | Pristine graphene | 75% Se; 7.5 nm | 454 | 605.3 | 89.68% |
| PG-C-1 | Pristine graphene | 75% Se (PVD) + PG | 296 | 394.7 | 58.47% |
| PG-C-2 | Pristine graphene | 75% Se + PG; ball-milled | 205 | 273.3 | 40.49% |
| PG-C-3 | Carbon black | 75% Se + CB; ball-milled | 170 | 226.7 | 33.58% |
| GO-1 | GO | 70% Se, External | 432 | 617.1 | 91.43% |
| GO-1C | GO | 70% Se, Chem reaction | 364 | 520.0 | 77.04% |
| RGO-1 | RGO | 70% Se, External | 434 | 620.0 | 91.85% |
| RGO-C | RGO | 70% Se, Chem reaction | 360 | 514.3 | 76.19% |
| NGO-1 | NGO | 70% Se, External | 422 | 602.9 | 89.31% |
| NGO-2 | NGO | 70% Se, in a cell | 416 | 594.3 | 88.04% |

TABLE 2-continued

Selenium utilization efficiency data for alkali metal-selenium cell cathodes containing various Se contents, Se coating thicknesses or particle diameters, substrate materials, and Se deposition methods.

| Sample ID | Cathode active layer material | % of Se and thickness or diameter (nm) | Cathode discharge capacity (mAh/g) | Discharge capacity, mAh/g, based on Se weight | Se utilization efficiency |
|---|---|---|---|---|---|
| f-GO-1 | f-GO | 65% Se; 9.0 nm, in a cell | 401 | 616.9 | 91.40% |
| f-GO-2 | f-GO | 80% Se; 9.1 nm, in a cell | 476 | 595.0 | 88.15% |
| f-GO-3 | f-GO | 95% Se; 4.8 nm, in a cell | 589 | 620.0 | 91.85% |
| EG-1 | Exfoliated graphite worms | 65% Se; 18.2 nm, external | 397 | 610.8 | 90.48% |
| EG-2 | Exfoliated graphite worms | 80% Se; 16.8 nm, external | 478 | 597.5 | 88.52% |
| EG-3 | Exfoliated graphite worms | 90% Se; 17 nm, external | 521 | 578.9 | 85.76% |
| EG-1C | Exfoliated graphite worms | 65% Se; ball-milled | 216 | 332.3 | 49.23% |
| EP-1 | Expanded graphite flakes | 65% Se; 16.4 nm, in a cell | 388 | 596.9 | 88.43% |
| EP-2 | Expanded graphite flakes | 80% Se; 17.7 nm, in a cell | 459 | 573.8 | 85.00% |
| EP-3 | Expanded graphite flakes | 80% Se; 20.5 nm, external | 448 | 560.0 | 82.96% |

The following observations can be made from the data of Table 2:

1) Thinner coatings prepared according to the instant invention lead to higher efficiency of Se utilization given comparable Se proportion. Given comparable Se coating thickness, the Se utilization efficiency is relatively independent of the S proportion deposited on graphene surfaces of a graphene material or exfoliated graphite material.
2) The presently invented electrochemical deposition method is significantly more effective than all conventional methods (PVD deposition, ball-milling, chemical reaction-based deposition, etc.) in terms of imparting Se utilization efficiency to the resulting cathode structure of a Li—Se, Na—Se, or K—Se cell.
3) Although both exfoliated graphite materials and graphene materials are very effective in imparting Se utilization efficiency, graphene materials (pristine graphene, GO, RGO, NGO, fGO, etc.) are relatively more effective than exfoliated graphite materials (graphite worms, expanded graphite flakes, etc.). Among various graphene materials, the efficiency is ranked as follows: Pristine graphene>fGO>NGO>RGO>GO. This is unexpected considering the notion that GO possess functional groups capable of binding with selenium.
4) Both external electrochemical deposition and internal electrochemical deposition are capable of depositing a high Se proportion while maintaining a thin Se coating (hence, high Se utilization efficiency). Prior art methods are not capable of achieving both.

The data in FIG. 3 further indicate that the presently invented Li—Se cell does not exhibit any significant decay (only 8.5%) even after 550 cycles. In contrast, the prior art cell containing PVD deposited S coating-based cathode suffers a 31.3% capacity decay after 550 cycles. The cell featuring a cathode containing ball-milled Se/AC powder suffers a 43.5% capacity decay after 550 cycles. In fact, it suffers a 20% capacity decay after 240 cycles. The cycle life of a lithium battery cell is usually defined as the number of cycles when the cell reaches a 20% capacity decay. With this definition, the prior art Li—Se cell featuring a ball-milled Se/AC cathode shows a cycle life of 240 cycles. These results are quite unexpected considering that the same type of graphene was used as the supporting material and the same amount of selenium was deposited in these three cell cathodes.

Figure 4:
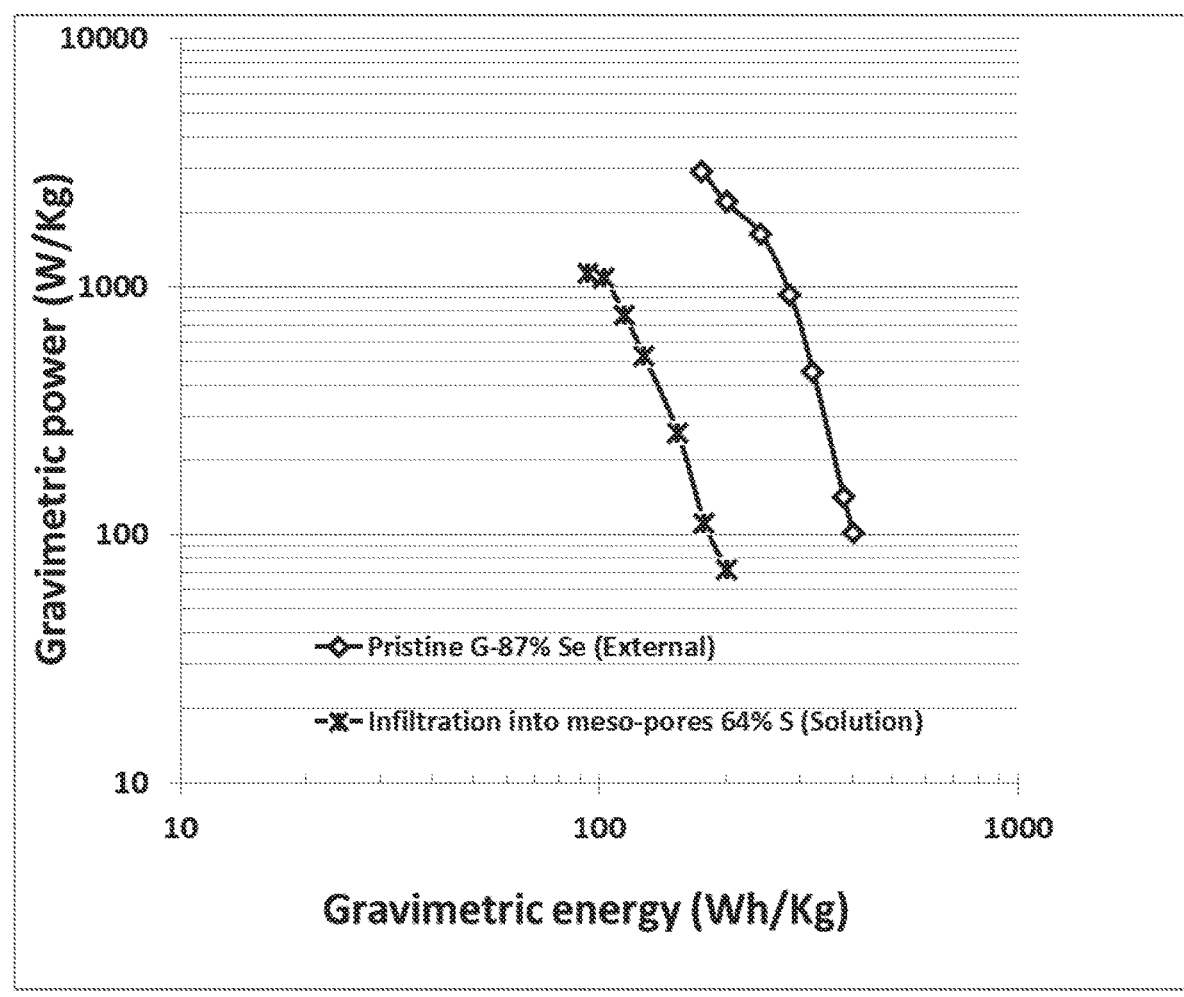
FIG. 4 Ragone plots (cell power density vs. cell energy density) of five Li metal-selenium cells: pristine graphene (PG)-based cathode containing electrochemically deposited selenium particles (87% Se), and mesoporous carbon-based cathode containing melt infiltration-deposited selenium particles (64.5% Se).

FIG. 4 shows Ragone plots (cell power density vs. cell energy density) of five Li metal-selenium cells. The presently invented Li—Se cell featuring a pristine graphene (PG)-based cathode containing electrochemically deposited selenium particles (87% by weight of S) exhibits an exceptional cell energy density (as high as 801 Wh/kg, based on total cell weight), which has not been previously achieved by any prior art Li—Se cell. The same cell also delivers a maximum power density as high as 2915 W/kg, which is significantly higher than typical power densities (up to 500 W/kg) of lithium-ion batteries. Another inventive Li—Se cell, featuring a PG-based cathode containing electrochemically deposited selenium particles (64% Se), exhibits an outstanding maximum cell energy density of 662 Wh/kg and maximum power density of 2,652 W/kg. These are also an unprecedented combination of high energy density and high power density.

In contrast, the PG-based cathode containing chemically deposited selenium particles (64% Se) enables the Li—Se cell to store up to 397 Wh/kg and delivers a maximum power density of 1,558 W/kg. These are significantly lower than those of the presently invented cells. The cell featuring a PG-based cathode containing solution-deposited selenium particles (64% Se) exhibits a maximum energy density of 357 Wh/kg and maximum power density of 1,488 W/kg. The CNT-based cathode containing solution-deposited selenium particles (64% Se) delivers a maximum cell energy density of 285 Wh/kg and maximum power density of 1,628 W/kg. These data have clearly demonstrated the unexpected yet superior effectiveness of the presently invented external and internal electrochemical deposition methods.

Figure 5:
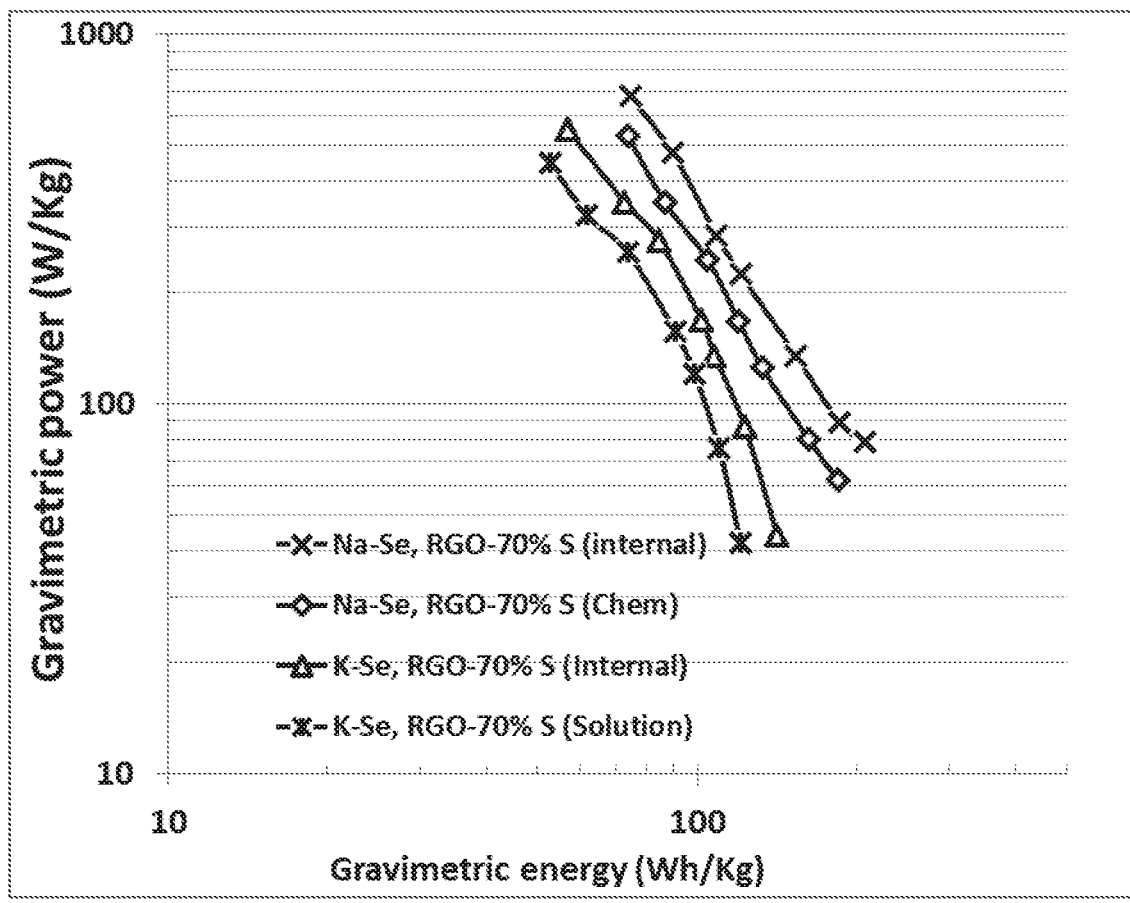
FIG. 5 Ragone plots (cell power density vs. cell energy density) of 4 alkali metal-selenium cells: Na—Se cell featuring a RGO-based cathode containing electrochemically deposited selenium particles (70% Se), Na—Se cell featuring a RGO-based cathode containing chemically deposited Se particles (70% Se), K—Se cell featuring a RGO-based cathode containing electrochemically deposited Se particles (70% Se), and K—Se cell featuring a RGO-based cathode containing solution-deposited Se particles (70% Se).

Shown in FIG. 5 are Ragone plots (cell power density vs. cell energy density) for 4 alkali metal-selenium cells. The first cell is a Na—Se cell featuring a RGO-based cathode containing electrochemically deposited selenium particles (70% Se), which exhibits the highest energy density and power density among the four cells. The second is a Na—Se cell featuring a RGO-based cathode containing chemically deposited selenium particles (70% Se). Clearly, the cathode having chemically deposited Se is not as effective as the presently invented cathode of electrochemically deposited Se in providing high energy density and power density. The third cell is a K—Se cell featuring a RGO-based cathode containing electrochemically deposited selenium particles (70% Se), and the fourth cell is a K—Se cell featuring a RGO-based cathode containing solution-deposited selenium particles (70% Se). Again, the presently invented electrochemical method is so much superior. The data in FIG. 5 also indicate that the presently invented Na—Se cells can store an energy density up to 287 Wh/kg, which is significantly higher than those of Li-ion batteries. Additionally, even K—Se cells can store up to 180 Wh/kg, better than most of the Li-ion cells. These highly surprising results are a good testament to the effectiveness of the presently invented method of depositing selenium on graphene surfaces.

In summary, the present invention provides an innovative, versatile, and surprisingly effective platform materials technology that enables the design and manufacture of superior alkali metal-selenium rechargeable batteries. The alkali metal-selenium cell featuring a cathode containing a graphene or exfoliated graphite structure with ultra-thin selenium electrochemically deposited thereon exhibits a high cathode active material utilization rate, high specific capacity, high specific energy, high power density, little or no shuttling effect, and long cycle life. When a similarly configured anode structure (with no selenium) or a nanostructured carbon filament web is implemented at the anode to support a lithium film (e.g. foil), the lithium dendrite issue is also suppressed or eliminated.

The invention claimed is:

1. An electrochemical method of producing a pre-selenized active cathode layer for a rechargeable alkali metal-selenium cell, said method comprising:
   (a) preparing an integral layer of porous graphitic structure having graphene surfaces with a specific surface area greater than 100 m$^2$/g, wherein said porous graphitic structure comprises a graphene material selected from pristine graphene, graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, or a combination thereof; an exfoliated graphite material selected from exfoliated graphite worms, expanded graphite flakes, or recompressed graphite worms or flakes; or a mixture of graphene material and exfoliated graphite material, and wherein said porous graphitic structure comprises multiple sheets of said graphene material or multiple flakes of said exfoliated graphite material that are intersected or interconnected to form said integral layer and may further comprise an optional binder of 0-10% by weight, an optional conductive filler included in said integral layer, or an optional selenium or selenium-containing compound pre-loaded therein at 0 to 49% by weight;
   (b) preparing an electrolyte comprising a non-aqueous solvent and a selenium source dissolved or dispersed in said solvent;
   (c) preparing an anode; and
   (d) bringing said integral layer of porous graphitic structure and said anode in ionic contact with said electrolyte and imposing an electric current between said anode and said integral layer of porous graphitic structure, serving as a cathode, with a sufficient current density for a sufficient period of time to electrochemically deposit nanoscaled selenium particles or coating directly on said graphene surfaces to form said pre-selenized active cathode layer, wherein said particles or coating have a thickness or diameter smaller than 20 nm.

2. The method of claim 1, wherein said selenium source is selected from M$_x$Se$_y$, wherein x is an integer from 1 to 3 and y is an integer from 1 to 10, and M is a metal element selected from an alkali metal, an alkaline metal selected from Mg or Ca, a transition metal, a metal from groups 13 to 17 of the periodic table, or a combination thereof.

3. The method of claim 1, wherein said anode comprises an anode active material selected from an alkali metal, an alkaline metal, a transition metal, a metal from groups 13 to 17 of the periodic table, or a combination thereof.

4. The method of claim 2, wherein said metal element M is selected from Li, Na, K, Mg, Zn, Cu, Ti, Ni, Co, Fe, or Al.

5. The method of claim 2, wherein said M$_x$Se$_y$ is selected from Li$_2$Se$_6$, Li$_2$Se$_7$, Li$_2$Se$_8$, Li$_2$Se$_9$, Li$_2$Se$_{10}$, Na$_2$Se$_6$, Na$_2$Se$_7$, Na$_2$Se$_8$, Na$_2$Se$_9$, Na$_2$Se$_{10}$, K$_2$Se$_6$, K$_2$Se$_7$, K$_2$Se$_8$, K$_2$Se$_9$, K$_2$Se$_{10}$, or a combination thereof.

6. The method of claim 1, further comprising a procedure of depositing an element Z to said porous graphitic structure wherein said element Z is mixed with selenium or formed as discrete Z coating or particles having a dimension less than 100 nm and said Z element is selected from Sn, Sb, Bi, S, Te, or a combination thereof and the weight of element Z is less than the weight of selenium.

7. The method of claim 6, wherein said procedure of depositing element Z includes electrochemical deposition, chemical deposition, or solution deposition.

8. The method of claim 1, wherein said nanoscaled selenium particles or coating occupy a weight fraction of at least 70% based on the total weights of said selenium particles or coating and said graphene material combined.

9. The method of claim 1, wherein said electrolyte further comprises a metal salt selected from lithium perchlorate (LiClO$_4$), lithium hexafluorophosphate (LiPF$_6$), lithium borofluoride (LiBF$_4$), lithium hexafluoroarsenide (LiAsF$_6$), lithium trifluoro-metasulfonate (LiCF$_3$SO$_3$), bis-trifluoromethyl sulfonylimide lithium (LiN(CF$_3$SO$_2$)$_2$), lithium bis (oxalato)borate (LiBOB), lithium oxalyldifluoroborate (LiBF$_2$C$_2$O$_4$), lithium oxalyldifluoroborate (LiBF$_2$C$_2$O$_4$), lithium nitrate (LiNO$_3$), Li-fluoroalkyl-phosphates (LiPF$_3$(CF$_2$CF$_3$)$_3$), lithium bisperfluoro-ethysulfonylimide (LiBETI), lithium bis(trifluoromethanesulphonyl)imide, lithium bis(fluorosulphonyl)imide, lithium trifluoromethanesulfonimide (LiTFSI), an ionic liquid-based lithium salt, sodium perchlorate (NaClO$_4$), potassium perchlorate (KClO$_4$), sodium hexafluorophosphate (NaPF$_6$), potassium hexafluorophosphate (KPF$_6$), sodium borofluoride (NaBF$_4$), potassium borofluoride (KBF$_4$), sodium hexafluoroarsenide, potassium hexafluoroarsenide, sodium trifluoro-metasulfonate (NaCF$_3$SO$_3$), potassium trifluoro-metasulfonate (KCF$_3$SO$_3$), bis-trifluoromethyl sulfonylimide sodium (NaN (CF$_3$SO$_2$)$_2$), sodium trifluoromethanesulfonimide (NaTFSI), bis-trifluoromethyl sulfonylimide potassium (KN(CF$_3$SO$_2$)$_2$), or a combination thereof.

10. The method of claim 1, wherein said solvent is selected from 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), a hydrofluoroether, a room temperature ionic liquid solvent, or a combination thereof.

11. The method of claim 1, wherein said anode, said electrolyte, and said integral layer of porous graphitic structure are disposed in an external container outside of a lithium-selenium cell and said step of electrochemically depositing nanoscaled selenium particles or coating on said graphene surfaces is conducted outside said lithium-selenium cell and said method further includes a step of incorporating said pre-selenized active cathode layer in said lithium-selenium cell.

12. The method of claim 1, wherein said anode, said electrolyte, and said integral layer of porous graphitic structure are disposed inside a lithium-selenium cell and said step of electrochemically depositing nanoscaled selenium particles or coating on said graphene surfaces is conducted after said lithium-selenium cell is produced.

13. The method of claim 1, wherein said anode, said electrolyte, and said integral layer of porous graphitic structure are part of a lithium-selenium cell and said step of electrochemically depositing nanoscaled selenium particles or coating on said graphene surfaces occurs after said lithium-selenium cell is fabricated and is conducted during a first charge cycle of said cell.

14. The method of claim 1, wherein said nanoscaled selenium particles or coating occupy a weight fraction of at least 80%.

15. The method of claim 1, wherein said nanoscaled selenium particles or coating occupy a weight fraction of at least 90%.

16. The method of claim 1, wherein said nanoscaled selenium particles or coating have a thickness or diameter smaller than 10 nm.

17. The method of claim 1, wherein said nanoscaled selenium particles or coating have a thickness or diameter smaller than 5 nm.

18. The method of claim 1, wherein said nanoscaled selenium particles or coating have a thickness or diameter smaller than 3 nm.

19. A pre-selenized active cathode layer produced by the method of claim 1 for a rechargeable alkali metal-selenium cell selected from lithium-selenium cell, sodium-selenium cell, or potassium-selenium cell, wherein said graphene sheets are chemically bonded together with an adhesive resin.

20. A rechargeable alkali metal-selenium cell comprising an anode active material layer, an optional anode current collector, a porous separator and/or an electrolyte, the pre-selenized active cathode layer of claim 19, and an optional cathode current collector, wherein said alkali metal-selenium cell is selected from lithium-selenium cell, sodium-selenium cell, or potassium-selenium cell.

21. The rechargeable alkali metal-selenium cell of claim 20 wherein said electrolyte is selected from polymer electrolyte, polymer gel electrolyte, composite electrolyte, ionic liquid electrolyte, non-aqueous liquid electrolyte, soft matter phase electrolyte, solid-state electrolyte, or a combination thereof.

22. The rechargeable alkali metal-selenium cell of claim 20 wherein said electrolyte contains an alkali salt selected from lithium perchlorate (LiClO$_4$), lithium hexafluorophosphate (LiPF$_6$), lithium borofluoride (LiBF$_4$), lithium hexafluoroarsenide (LiAsF$_6$), lithium trifluoro-metasulfonate (LiCF$_3$SO$_3$), bis-trifluoromethyl sulfonylimide lithium (LiN(CF$_3$SO$_2$)$_2$, lithium bis(oxalato)borate (LiBOB), lithium oxalyldifluoroborate (LiBF$_2$C$_2$O$_4$), lithium oxalyldifluoroborate (LiBF$_2$C$_2$O$_4$), lithium nitrate (LiNO$_3$), Li-fluoroalkyl-phosphates (LiPF$_3$(CF$_2$CF$_3$)$_3$), lithium bisperfluoroethysulfonylimide (LiBETI), an ionic liquid salt, sodium perchlorate (NaClO$_4$), potassium perchlorate (KClO$_4$), sodium hexafluorophosphate (NaPF$_6$), potassium hexafluorophosphate (KPF$_6$), sodium borofluoride (NaBF$_4$), potassium borofluoride (KBF$_4$), sodium hexafluoroarsenide, potassium hexafluoroarsenide, sodium trifluoro-metasulfonate (NaCF$_3$SO$_3$), potassium trifluoro-metasulfonate (KCF$_3$SO$_3$), bis-trifluoromethyl sulfonylimide sodium (NaN(CF$_3$SO$_2$)$_2$), sodium trifluoromethanesulfonimide (NaTFSI), bis-trifluoromethyl sulfonylimide potassium (KN(CF$_3$SO$_2$)$_2$), or a combination thereof.

23. The rechargeable alkali metal-selenium cell of claim 20 wherein said solvent is selected from ethylene carbonate (EC), dimethyl carbonate (DMC), methylethyl carbonate (MEC), diethyl carbonate (DEC), ethyl propionate, methyl propionate, propylene carbonate (PC), gamma-butyrolactone (γ-BL), acetonitrile (AN), ethyl acetate (EA), propyl formate (PF), methyl formate (MF), toluene, xylene or methyl acetate (MA), fluoroethylene carbonate (FEC), vinylene carbonate (VC), allyl ethyl carbonate (AEC), 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, room temperature ionic liquid, or a combination thereof.

24. The rechargeable alkali metal-selenium cell of claim 20, further comprising a layer of protective material disposed between said anode and said porous separator, wherein said protective material is a lithium ion conductor.

25. The rechargeable alkali metal-selenium cell of claim 24, wherein said protective material consists of a solid electrolyte.

26. The rechargeable alkali metal-selenium cell of claim 20 wherein said anode active material layer contains an anode active material selected from lithium metal, sodium metal, potassium metal, a lithium metal alloy, sodium metal alloy, potassium metal alloy, a lithium intercalation compound, a sodium intercalation compound, a potassium intercalation compound, a lithiated compound, a sodiated compound, a potassium-doped compound, lithiated titanium dioxide, lithium titanate, lithium manganate, a lithium transition metal oxide, Li$_4$Ti$_5$O$_{12}$, or a combination thereof.

27. The rechargeable alkali metal-selenium cell of claim 20 wherein said cell is a lithium ion-selenium cell and said anode active material layer contains an anode active material selected from the group consisting of:
  (a) silicon (Si), germanium (Ge), tin (Sn), lead (Pb), antimony (Sb), bismuth (Bi), zinc (Zn), aluminum (Al), nickel (Ni), cobalt (Co), manganese (Mn), titanium (Ti), iron (Fe), and cadmium (Cd), and lithiated versions thereof;

(b) alloys or intermetallic compounds of Si, Ge, Sn, Pb, Sb, Bi, Zn, Al, or Cd with other elements, and lithiated versions thereof, wherein said alloys or compounds are stoichiometric or non-stoichiometric;

(c) oxides, carbides, nitrides, sulfides, phosphides, selenides, and tellurides of Si, Ge, Sn, Pb, Sb, Bi, Zn, Al, Fe, Ni, Co, Ti, Mn, or Cd, and their mixtures or composites, and lithiated versions thereof;

(d) salts and hydroxides of Sn and lithiated versions thereof;

(e) carbon or graphite materials and prelithiated versions thereof; and combinations thereof.

28. The rechargeable alkali metal-selenium cell of claim 20, wherein said cell is a sodium ion-selenium cell or potassium ion-selenium cell and said anode active material layer contains an anode active material selected from the group consisting of:

(a) sodium- or potassium-doped silicon (Si), germanium (Ge), tin (Sn), lead (Pb), antimony (Sb), bismuth (Bi), zinc (Zn), aluminum (Al), titanium (Ti), cobalt (Co), nickel (Ni), manganese (Mn), cadmium (Cd), and mixtures thereof;

(b) sodium- or potassium-containing alloys or intermetallic compounds of Si, Ge, Sn, Pb, Sb, Bi, Zn, Al, Ti, Co, Ni, Mn, Cd, and their mixtures;

(c) sodium- or potassium-containing oxides, carbides, nitrides, sulfides, phosphides, selenides, tellurides, or antimonides of Si, Ge, Sn, Pb, Sb, Bi, Zn, Al, Fe, Ti, Co, Ni, Mn, Cd, and mixtures or composites thereof, (d) sodium or potassium salts;

(e) particles of graphite, hard carbon, soft carbon or carbon particles and pre-sodiated versions thereof; and combinations thereof.

29. The rechargeable alkali metal-selenium cell of claim 20 wherein said graphene material comprises nanographene sheets or platelets with a thickness less than 10 nm.

30. The rechargeable alkali metal-selenium cell of claim 20 wherein said graphene material comprises nanographene sheets or platelets selected from single-layer or few-layer pristine graphene, wherein few-layer is defined as 10 planes of hexagonal carbon atoms or less.

31. The rechargeable alkali metal-selenium cell of claim 20 wherein said binder material is selected from a resin, a conductive polymer, coal tar pitch, petroleum pitch, mesophase pitch, coke, or a derivative thereof.

32. The rechargeable alkali metal-selenium cell of claim 20 wherein said porous graphitic structure has a specific surface area greater than 500 $m^2/g$.

33. The rechargeable alkali metal-selenium cell of claim 20 wherein said porous graphitic structure has a specific surface area greater than 750 $m^2/g$.

34. The rechargeable alkali metal-selenium cell of claim 20 wherein said cathode has an active material utilization rate no less than 80%.

35. The rechargeable alkali metal-selenium cell of claim 20 wherein said cathode has an active material utilization rate no less than 90%.

36. The rechargeable alkali metal-selenium cell of claim 20, wherein said cathode contains at least 95% by weight of selenium based on the total weight of said porous graphitic structure and selenium combined.

* * * * *